United States Patent
Kitazaki et al.

(10) Patent No.: US 6,515,813 B2
(45) Date of Patent: Feb. 4, 2003

(54) METHOD FOR CONTROLLING SERVO INFORMATION DETECTION TIMING AND ROTATIONAL SPEED OF DISK, AND DISK DRIVE

(75) Inventors: Nobuyuki Kitazaki, Chigasaki (JP); Kenji Ogasawara, Fujisawa (JP); Yutaka Ozawa, Fujisawa (JP); Isao Yoneda, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/764,538

(22) Filed: Jan. 17, 2001

(65) Prior Publication Data

US 2001/0021075 A1 Sep. 13, 2001

(30) Foreign Application Priority Data

Jan. 17, 2000 (JP) ........................................ 2000-007318

(51) Int. Cl.⁷ .................................................. G11B 5/09
(52) U.S. Cl. ........................ 360/51; 360/73.03; 360/75; 360/77.08
(58) Field of Search ................................ 360/73.03, 31, 360/51, 75, 61, 63, 77.02, 77.04, 77.08, 78.14; 369/53.1, 53.14, 53.13, 53.12; 386/14, 15, 86, 87

(56) References Cited

U.S. PATENT DOCUMENTS

| | | | | |
|---|---|---|---|---|
| 5,617,388 A | * | 4/1997 | Ishioka et al. | 360/77.04 |
| 5,748,398 A | * | 5/1998 | Seo | 360/51 |
| 6,128,153 A | * | 10/2000 | Hasegawa et al. | 360/77.04 |
| 6,166,875 A | * | 12/2000 | Ueno et al. | 360/77.04 |
| 6,351,440 B1 | * | 2/2002 | Fukuda et al. | 369/47.36 |

* cited by examiner

*Primary Examiner*—Alan T. Faber
(74) *Attorney, Agent, or Firm*—Abdy Raissinia; Bracewell & Patterson, L.L.P.

(57) ABSTRACT

A method to enable servo information to be detected surely and stably even when a time interval between servo sectors is changed due to disk shifting. A time interval TS(i) is calculated according to an internal variable value, which is in proportion to a displacement Δr(i) of a servo area SF(i) in a radial direction of a subject disk (step S6). The displacement Δr(i) is calculated from already detected servo information[, thereby]. Thereby, a time interval for detecting servo information is adjusted according to the above described time interval TS(i) (steps S7 and S4). The time interval TS(i) is the time interval between passing of a servo sector in the servo area SF(i) under the head H and passing of a servo sector in the servo area SF(i+1) under the head H.

12 Claims, 14 Drawing Sheets

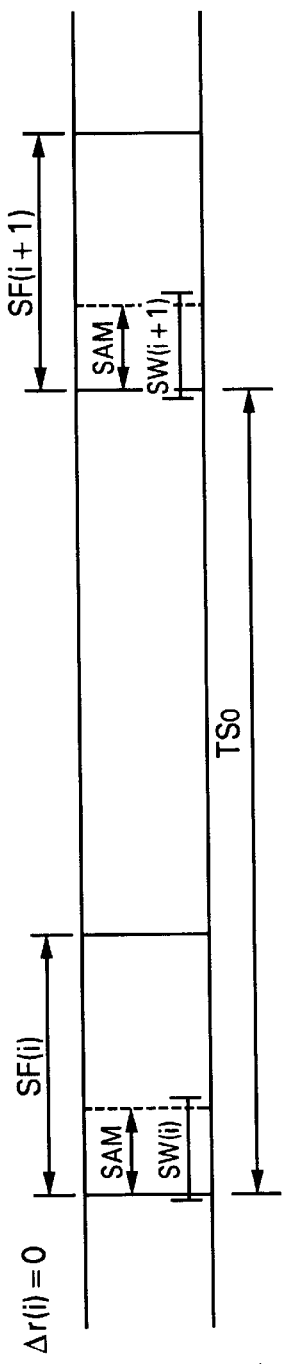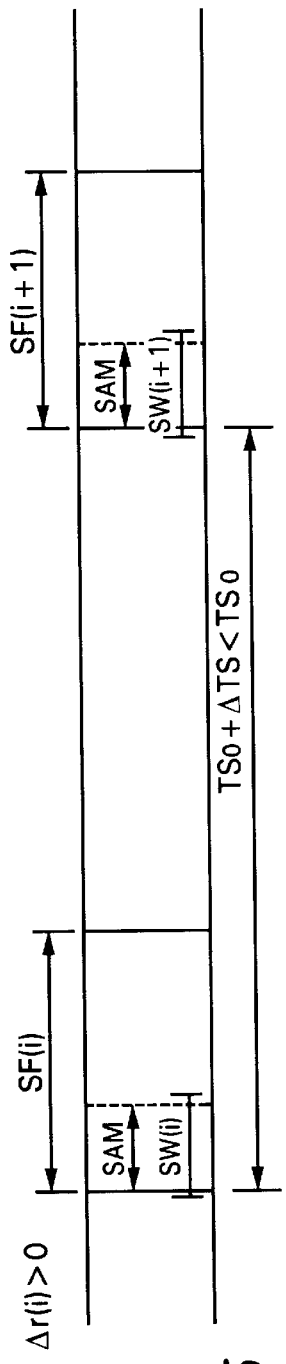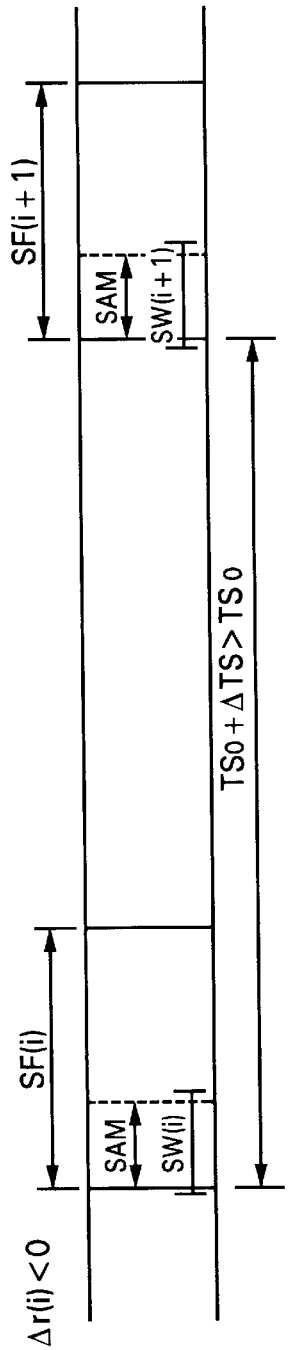

METHOD FOR CONTROLLING SERVO INFORMATION DETECTION TIMING AND ROTATIONAL SPEED OF DISK, AND DISK DRIVE

BACKGROUND OF THE INVENTION

1. Technical Field

The present invention relates to a disk drive provided with a disk recording medium having a sector servo format, and in particular to a servo information detection timing controlling method for controlling the timing of servo information detection in a signal read from the disk recording medium in the disk drive. The invention further relates to a disk rotational speed controlling method for controlling the rotational speed of the disk recording medium in the disk drive, and more particularly to a servo information detection timing controlling method and a disk rotational speed controlling method that can detect servo information stably and surely even when the disk is shifted from a rotation center of the disk recording medium.

2. Description of the Related Art

Occasionally, as shown in FIG. 4, a center C of servo information writing (i.e., center of a track) is shifted from a center 0 of the disk rotation (i.e., center of the spindle rotation) in a disk drive provided with a disk recording medium having a sector servo format, and the radius from the center 0 of the disk rotation in a servo sector in the same track is changed.

In order to compensate such a radius change in a servo sector that occurs due to disk shifting as described above, there is disclosed a technique that enables servo controlling with use of a peak filter that employs, for example, the same frequency as that of the disk rotational speed (rpm) as its peak frequency.

FIG. 14 is a flowchart of a conventional servo system controlling procedure that compensates disk shifting with use of such a peak filter. Steps S1 to S5 and S8 to S15 in FIG. 14 are identical to those with the same numbers in FIG. 9 in the first embodiment of the present invention to be described later. The steps S1 to S3 and S10 to S15 will be described with reference to FIG. 9.

At first, in step S4, a search window is set for a signal read by a head from a disk so as to search a servo address mark (SAM) for recognizing a servo area. The SAM is recorded in the servo area.

In case the SAM is detected in step S4, thereby the servo area state is decided as a servo lock and the head is not changed in step S5, the initial value $TS_0$ of a time interval between servo sectors is set in step S41. Consequently, the search window is set for each time interval $TS_0$.

Then, in step S8, servo information is sampled from the signal read from the servo area and according to this servo information, a VCM control current value CNT is calculated. In addition, a VCM control current value CNTF obtained by filtering the VCM control current value CNT with use of the above peak filter is calculated. This VCM control current value CNTF is then supplied to the VCM driver.

After that, in step S9, the above VCM control current value CNTF is used to calculate an internal variable value of the peak filter. Control then goes back to step S4.

Because the above VCM control current value CNTF includes a displacement Δr component of the servo sector in the radial direction of the disk, which is caused by disk shifting, the head position is compensated according to the radius change of the servo sector from the center O of the disk rotation.

Problems to be Solved by the Invention

However, the above conventional method may not detect a servo address mark SAM, since the SAM does not come into the search window in the worst case. This is because a search window is set at a fixed time interval, whereby disk shifting causes the radius of a servo sector from the center of the disk rotation and the time interval between servo sectors to be changed thereby causing a margin for detecting servo information surely and stably to be reduced. Consequently, in some cases, the conventional method may detect user data as a SAM by mistake.

Under such circumstances, the present invention recognizes that a need exists o provide a servo information detection timing controlling method and a disk rotational speed controlling method that can detect servo information surely and stably even when a time interval between servo sectors is changed due to disk shifting.

SUMMARY OF THE INVENTION

In order to achieve the above object, a servo information detection timing controlling method of the present invention comprises (1) calculating a time interval TS(i) between passing of a servo sector in a servo area SF(i) under the read/write head and passing of a servo sector in a next servo area SF(i+1) under the read/write head according to a displacement Δr(i) of the servo area SF(i) calculated with use of already detected servo information in the radial direction of the disk, and (2) adjusting a time interval for detecting servo information according to the time interval TS(i).

In another embodiment, the invention provides a disk rotational speed controlling method comprising (1) calculating a compensation value for the rotational speed of the disk recording medium for keeping at a predetermined value the time interval between passing of a servo sector in a servo area SF(i) under the read/write head and passing of a servo sector in the next servo area SF(i+1) under the read/write head according to the displacement Δr(i) of the servo area SF(i) calculated with use of already detected servo information in the radial direction of the disk, and (2) adjusting the rotational speed of the disk recording medium according to the compensation value.

DESCRIPTION OF THE DRAWINGS

FIG. 8 shows a servo information detection timing controlling procedure in a first embodiment of the present invention.

DESCRIPTION OF THE PREFERRED EMBODIMENT

The following represents a list of some of the common symbols and/or acronyms utilized within:

Description of Symbols

Figure 1:
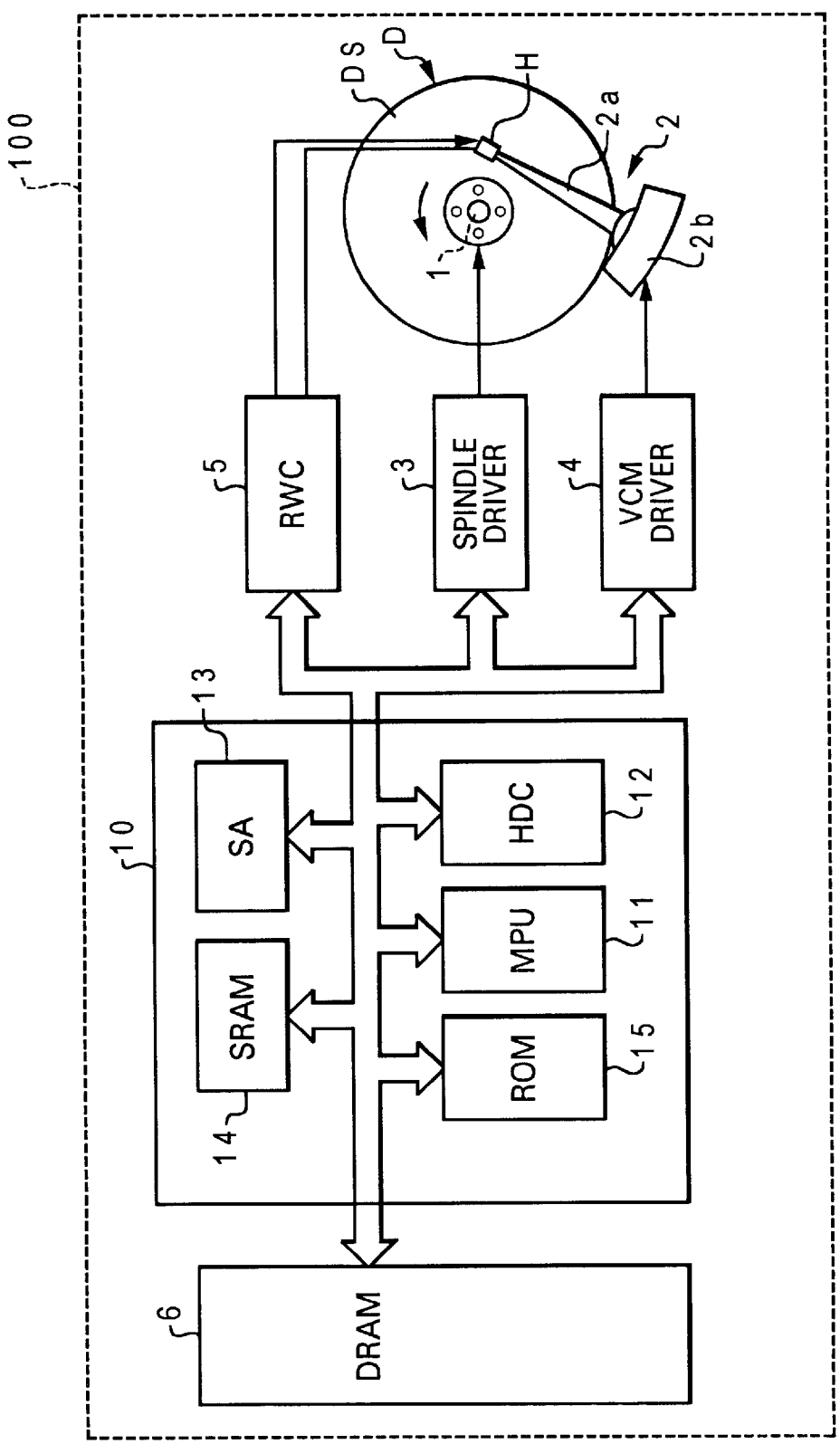
FIG. 1 is a block diagram of a disk drive utilized in an embodiment of the present invention.

1 . . . Spindle Motor
2 . . . Access Mechanism
2a . . . Access Arm
2b . . . Voice Coil Motor (VCM)
3 . . . Spindle Driver
4 . . . VCM Driver
5 . . . Read/Write Channel (RWC)
6 . . . DRAM
10 . . . Controller
11 . . . Micro Processing Unit (MPU)
12 . . . Hard Disks Controller (HDC)
14 . . . SRAM
13 . . . Servo Assist (SA)
15 . . . ROM
D . . . Disk
H . . . Read/Write Head FIG. 1 is a block diagram of a disk drive in a first embodiment of the present invention. The disk drive 100 shown in FIG. 1 comprises a disk (a hard disk) D, which is a recording medium; a spindle motor 1 for rotating the disk D, and an access mechanism 2 for accessing the disk D. Disk drive further comprises a spindle driver 3, a voice coil motor driver (VCM driver) 4, a read/write channel (RWC) 5, a DRAM 6, and a controller 10. Also, in FIG. 1, the data bus line is illustrated, and the control line is omitted.

The disk D consists of one or a plurality of disks fixed unitarily to the same shaft of the spindle motor 1. When the spindle motor is driven by the spindle driver 3, the disk(s) are rotated unitarily with the shaft. The spindle driver 3 drives the spindle motor 1 so as to rotate the disk D at a uniform target speed (rpm).

The access mechanism 2 is configured by a read/write head H for writing/reading data on/from the disk D, an access arm 2a having the head H at its tip, and a voice coil motor (VCM) 2b for rotating the access arm 2a. The head H, when the access mechanism 2 is driven by the VCM driver 4, rotates unitarily with the access arm 2a and moves in the radial direction of the disk D. Because data can be recorded on both sides of the disk D, the head H is provided for each disk surface DS. The VCM driver 4 supplies a VCM control current to the VCM 2b according to the VCM control current value supplied from the controller 10 so as to drive the access mechanism 2.

A side identification number k(k=0, 1, 2 . . . ) is given to each of the heads H and to each of the disk surfaces DS. Hereinafter, a head H and a disk surface DS with a side identification number k respectively will be described as H(k) and DS(k). The head H(k) accesses the disk surface DS(k).

RWC 5 changes active heads H in response to a head change command received from the controller 10. A signal read by the active head $H(k_T)$ from the disk surface $DS(K_T)$ is rectified and amplified, then subjected to an analog-digital (A/D) conversion. The converted signal is then sent to the controller 10. The RWC 5 converts write data entered from the controller from digital to analog, then the date is sent to the active head $H(k_T)$ and written in a data area on the disk surface $DS(k_T)$.

The DRAM 6 stores user data to be written on the disk D or read from the disk D temporarily and also stores data, parameters, tables, etc. required for controlling disk access.

The controller 10 is configured by a micro processing unit (MPU) 11; a hard disk controller (HDC) 12; a servo assist (SA) 13; an SRAM 14 into which arithmetic data, etc. are to be written; and a ROM 15. The controller 10 controls the whole disk drive 100.

The ROM 15 stores the firmware used to control the whole disk drive. Sometimes, part of the firmware is recorded in a special area secured on a disk surface DS in advance. In such a case, part of the firmware recorded in the special area is read into the DRAM 6 when the disk drive 100 is started up.

The MPU 11 executes the above firmware so as to control the spindle driver 3 and the HDC 12. The HDC 12 controls the VCM driver 4, the RWC 5, and the SA 13.

The SA 13 is a hardware sequencer dedicated to computing for the servo system. Consequently, the SA 13 is enabled for faster computing than the MPU 11.

The access mechanism 2, the VCM driver 4, the WRC 5, and the controller 10 are combined to configure a head servo system used to control the position of the head H. The spindle motor 1, the spindle driver 3, and the controller 10 are combined to configure a disk servo system used to control the rotational speed of the disk D.

Structure of Sector Servo Format Disk Surface DS

Figure 2:
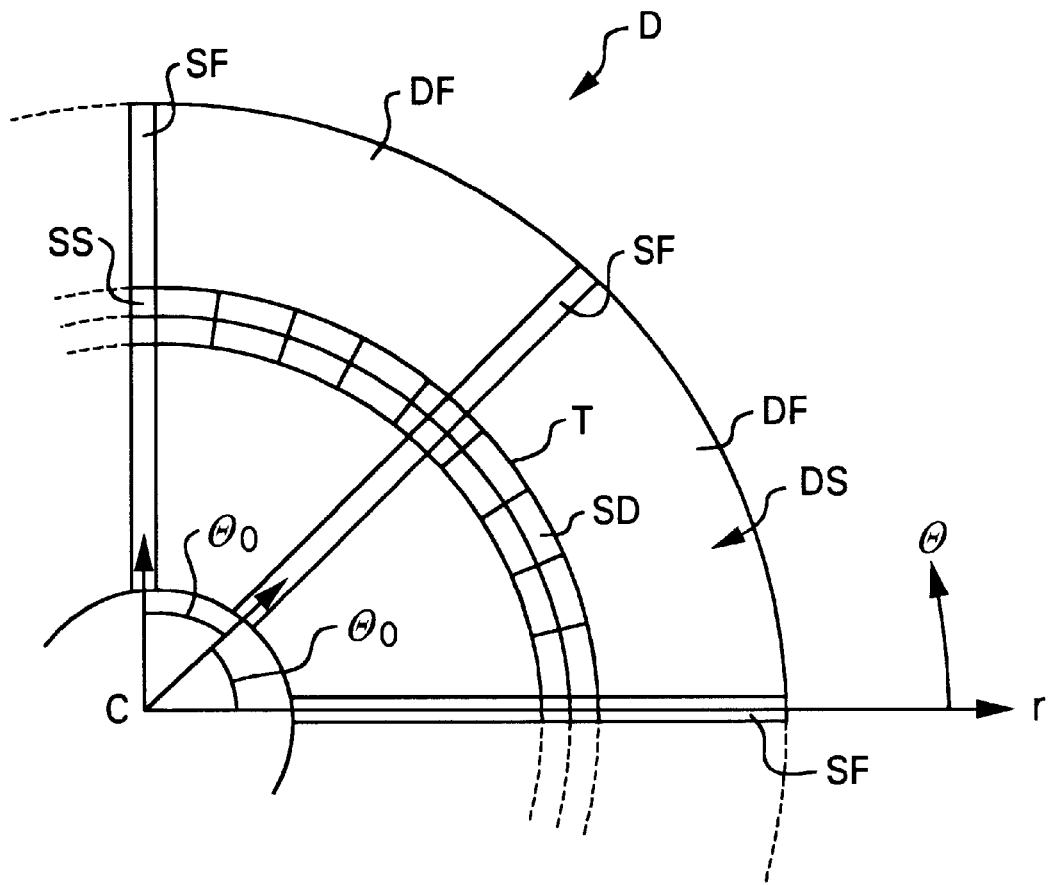
FIG. 2 is a block diagram of a disk surface according to the invention.

FIG. 2 shows a structure of a disk surface DS. As shown in FIG. 2, the disk surface DS is divided into a plurality of data areas DF in which user data is to be recorded respectively and a plurality of servo areas SF in which servo information is recorded in advance respectively. The disk surface DS is further divided into a plurality of tracks T. A disk surface DS partitioned into a plurality of data areas DF and a plurality of servo areas SF as shown in FIG. 2 is referred to as a sector servo format disk surface DS.

Tracks T are disposed concentrically at equal track widths (in the radial direction of the disk). A cylinder identification number j(j=0, 1, 2 . . . ) is given to each of the tracks T outwardly from the center of the disk D or inwardly from the outer periphery of the disk D. The track with a cylinder identification number j is described as T(j). Tracks whose radii from the center C of servo information writing (see FIG. 2) are equal on different disk surfaces DS are configured so as to look like one cylinder. One and the same cylinder identification number is thus given to those tracks T.

Servo areas SF are disposed at equal intervals in units of a predetermined angle $q_o$ as shown in FIG. 2. For example, 60 servo areas SF are formed for each angle $q_0=6°$. A servo area identification number i(i=1, 2, 3 . . . ) is given to each servo area SF clockwise or counter-clockwise (that is, in order of servo areas above which the head H passes). A servo area SF with a servo area identification number i will be described as SF(i). And, the n-th servo area backward from the SF(i) will be described as SF(i−n). The n-th servo area forward from the SF(i) will be described as SF(i+n). For example, in case of i=30 and n=1 while there are 60 servo areas SF(1) to SF(60) on a disk surface DS, i−n becomes 29 and i+n becomes 31. However, if i=n=1, i−n becomes 60. If i=60 and n=2, i+n becomes 2.

When the coordinates r and q shown in FIG. 2 are assumed to be common to all the disk surfaces DS, the angle q from the axis r of the servo area SF(i) differs among disk surfaces DS. For example, servo areas SF(i), SF(2), SF(3), . . . are disposed at angles q=0°, 6°, 12°, . . . from the axis r on a disk surface DS while servo areas SF(1), SF(2), SF(3), . . . are disposed at angles q=3°, 9°, 15°, . . . from the axis r on another disk surface DS.

A servo area SF(i) is partitioned in a plurality of servo sectors SS by a track T respectively. A servo sector SS partitioned by the servo area SF(i) and the track T(j) is described as SS(i,j).

Structure of a Servo Area SF

Figure 3:
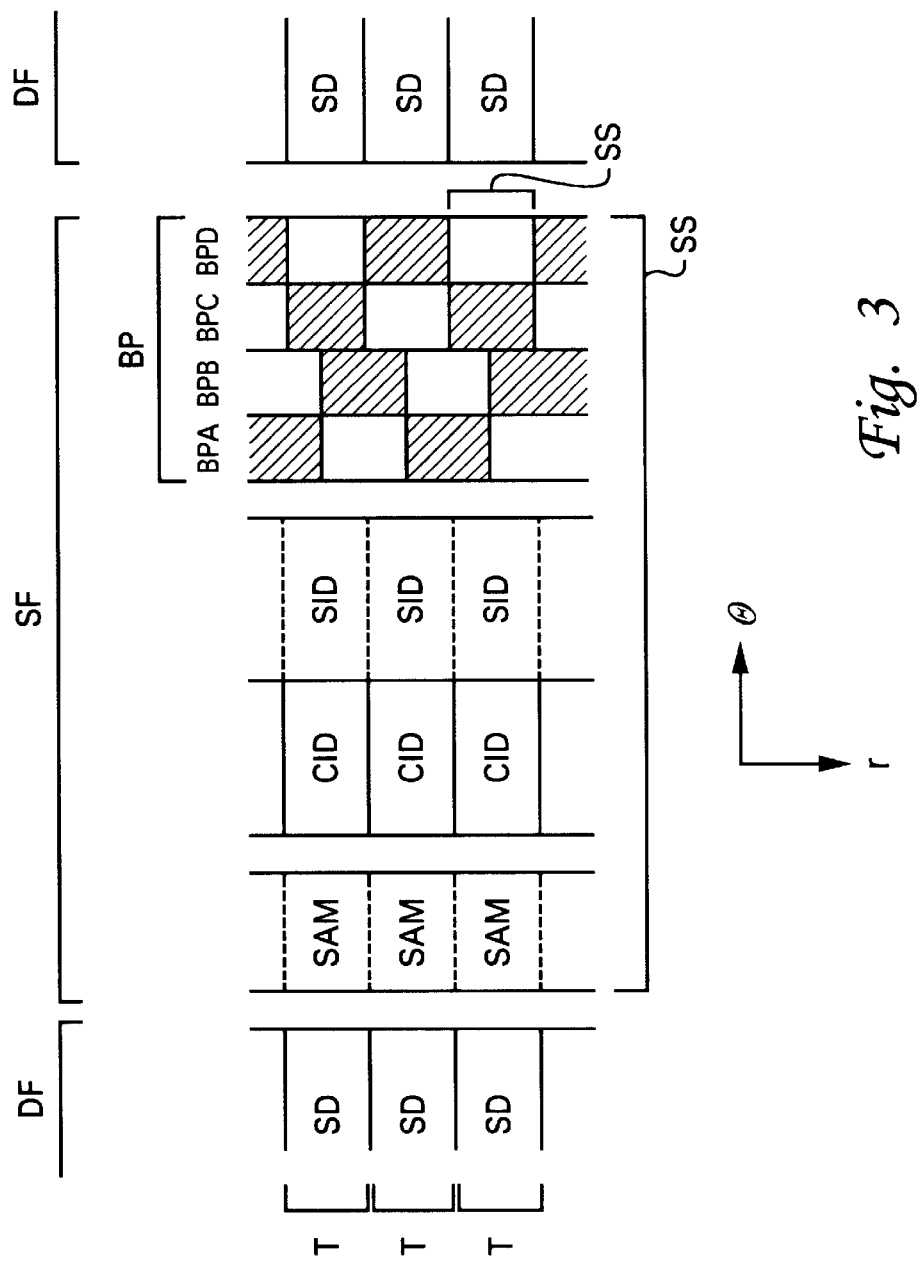
FIG. 3 is a structure of a servo area on a disk surface.

FIG. 3 shows a structure of a servo area SF. As shown in FIG. 3, servo information written in a servo area SF in advance includes a servo address mark SAM, a cylinder identification number code CID (cylinder identification number j code), a servo area identification number code SID (servo area identification number i code), and a burst pattern BP.

The servo address mark SAM is used to identify the position of a servo area SF. The controller 10 sets a search window for a signal read by a head H from a disk surface DS and searches and detects the SAM in this search window, thereby recognizing the position of the servo area SF. The same SAM is recorded in all servo sectors SS.

The cylinder identification number code CID is recorded in each servo sector SS as a gray code (cyclic binary code). Because this cylinder identification number code CID is a code of a cylinder identification number j, the same code is recorded in each of the servo sector SS(1,j), SS(2,j), . . . of a track T(j). And, as a matter of course, different codes are recorded in servo sectors SS(i,0), SS(i,1), . . . of a servo area SF(i). The above gray code is set so that only one bit value in the binary code differs between adjacent tracks T. It is therefore possible to identify each of the adjacent tracks T even when the head H is positioned around the boundary between them.

The servo area identification number code SID is recorded in each servo sector SS as an ordinary binary code. Because this servo area identification number code SFID is a code of a servo area identification number i, the same code is recorded in each of servo sectors SS(i,0), SS(i,1) . . . of a servo area SF(i). As a matter of course, different codes are recorded in servo sectors SS(1,j), SS(2,j), . . . of a track T(j).

The burst pattern BP consists of burst pattern strings BPA, BPB, BPC, and BPD disposed in the radial direction of the disk. In each burst pattern strings are alternately disposed signal-recorded areas and no-signal-recorded areas.

The data area DF is formed between servo areas SF as shown in FIG. 2. Each data area DF in a track T is partitioned into one or a plurality of data sectors SD. User data to be stored in one data sector SD is, for example, 512 bytes in length.

Disk Accessing Procedure

The controller 10 controls disk accesses (reading/writing of data) by a head H in the following procedure. The controller:

(a) controls the RWC 5 so as to change an active head H to another head $H(k_T)$ (head change) provided on the disk surface $DS(k_T)$ to be accessed;

(b) sets a search window for a signal read by the head $H(k_T)$ and searches a servo address mark SAM from the search window (if it is possible to detect the SAM, positions of both servo area and data area can be known in the above read signal, thereby the CID, the SID, and the BP can be sampled from the above read signal), (c) samples servo information (CID, SID, and BP described above) from the above read signal in case the SAM is detected (servo-locked), thereby calculating the PES (Positioning Error Signal) value equivalent to the displacement of the head $H(k_T)$ from the target position in the target track $T(j_T)$ according to those servo information items, etc., then calculating the VCM control current value according to this PES value, etc., (d) supplies the above VCM control current value to the VCM driver 4 to let the VCM driver 4 drive the access mechanism 2, thereby moving the head $H(k_T)$ to seek the target track $T(j_T)$ (track seeking) and controls the head $H(k_T)$ so that the moving speed of the head $H(k_T)$ is reduced and positions the head at the target position (settling) and let the head $H(k_T)$ follow the target position (track following): and (e) supplies a write data signal to the head $H(k_T)$ when the head $H(k_T)$ passes above the write target data sector SD during a write command processing in case the head can follow the target track $T(j_T)$. Thus, data is written in the target position. For a read command processing, the controller 10 samples data recorded in the read target data sector SD from a signal read by the head $H(k_T)$, thereby reading the data.

Each time the controller 10 detects a SAM in the above step (b), the controller 10 updates the VCM control current value in step (c) and controls the position of the head $H(k_T)$ with use of the VCM control current value. Consequently, the head $H(k_T)$ seeks the target track T $(j_T)$, then positions in the target position in the target track $T(j_T)$ (settling) and follows the target position.

Servo Information Sampling

Following, a description is made for a procedure in which the controller 10, after detecting the SAM in the servo area SF(i), samples the servo information in the servo area SF(i) from the signal read by the head $H(k_T)$, then calculates the VCM control current value according to this sampled servo information. At first, the controller 10 samples the cylinder identification number j and the servo area identification number i from the above read signal, then samples the level of the burst pattern BP (BPA, BPB, BPC, and BPD). The above cylinder identification number j is that of the track T(j) on which the head $H(k_T)$ is currently positioned. The controller 10 then calculates the position (in the radial direction of the disk) of the head H in the currently positioned track T(j) according to the level of the burst pattern BP.

Calculating both PES (Positioning Error Signal) Value and VCM Control Current Value Next, the controller 10 calculates the value P(i) of the PES (Positioning Error Signal) equivalent to the displacement of the head $H(k_T)$ from the above target position in the servo area SF(i) according to the cylinder identification number j of the track T in which the head $H(k_T)$ is currently positioned. The P(i) calculation also utilizes the position of the head $H(k_T)$ in this track T(j), the cylinder identification number $j_T$ of the target track, and the target position in this target track. The PES is a signal whose value is changed according to the displacement of the head $H(k_T)$ from the target position whether the head $H(k_T)$ is positioned in the target track $T(j_T)$ or not. The signal value becomes 0 in case the head $H(k_T)$ is positioned above the target position in the target track $T(j_T)$. Then, the controller 10 calculates a differential value, an integral value, etc. of the PES from this PES value P(i) and the PES value P(i−1) in the previous servo area SF(i−1), etc.

Following, the controller 10 calculates the VCM control current value CNT(i) according to the PES value P(i) in the servo area SF(i), and the differential and integral values of the PES, etc.

Filtering the VCM Control Current by Peak Filter

The VCM control current value CNT(i) calculated according to the PES, etc. includes a shift component of the servo sector position from the disk rotation center, which is caused by disk shifting. Therefore, in case the VCM control current value CNT(i) is supplied to the VCM driver as is, the current might cause the servo system to become unstable. In order to avoid this, therefore, the VCM control current value CNT(i) is filtered with use of a peak filter and the filtered VCM control current value CNTF(i) is supplied to the VCM driver. This filtering can thus compensate the change of the radius of the servo sector SS from the disk rotation center, which is caused by disk shifting.

In order to compensate such disk shifting, etc., the controller 10 calculates a servo control value CNTF(i) obtained by filtering the VCM control current value CNT(i) with use of a peak filter whose peak frequency is identical to the disk rotational speed (rpm) (for example, the peak frequency is defined as 70 [Hz] and the peak gain is defined as 10 to 20 dB in case the disk rotational speed is 70 revolutions per second [/s]). The above peak filter is a digital filter and its substance is an operational expression. For example, an operation is done by the peak filter as follows:

$$CNTP(i)=CNT(i)+K_1CNT(i-1)+K_2CNT(i-2)$$

The peak filter's internal change PF(i) is calculated as follows:

$$PF(i)=K_1CNT(i-1)+K_2CNT(i-2) \qquad (1)$$

Concretely, filtering by the peak filter is done as follows; the peak filter internal variable value PF(i) is added to the VCM control current value CNT(i) and the result value is utilized as a filtered VCM control current value CNTP(i). The above $K_1$ and $K_2$ are preset constants, and, when a proper value is set for each of those constants $k_1$ and $k_2$, the peak filter's internal variable value PF(i) becomes a change component of the above radius caused by disk shifting. The VCM control current value CNTP(i) is then obtained by eliminating the above radius change component from the VCM control current value CNT(i). The obtained VCM control current value CNTP(i) is supplied to the VCM driver 4.

In order to eliminate an instantaneous disturbance, etc., the above VCM control current value CNTP(i) is further filtered with use of a notch filter (e.g., notch frequency: 3.2 [kHz] and notch gain: −40 to −30 [dB]) in some embodiments, then, the filtered current is supplied to the VCM driver.

Change of Servo Sector Radius Caused by Disk Shifting

Assuming that R(j) is the radius of a track T(j), d is a disk shifting distance (a shifting distance of the track center, which is the center of servo information writing from the disk rotation center (spindle shaft rotation center), $i_0$ is a servo area identification number in the disk shifting direction, and N is the number of servo areas SF (ex., N=60), the radius r(i) of a servo sector SS(i,j) of a track T(j) from the disk rotation center is calculated as follows:

$$r(i,j)=R(j)+d'\cos\{2p(i-i0)/N\}=R(j)+\Delta r(i)$$

The currently r(i) is the displacement of the servo area SF(i) caused by disk shifting in the radial direction of the disk. The value is the same in each of the servo sectors SS(i,0), SS(i,1), . . . .

Compensating Disk Shifting in the Radial Direction of the Disk by a Peak Filter The internal variable value PF(i) of the above peak filter is in proportion to the displacement Δr(i) of the servo area SF(i) in the radial direction of the disk. The value PF(i) is calculated as follows:

$$\Delta r(i)=K'PF(i) \qquad (2)$$

The internal variable value PF(i) is in proportion to the change Δr(i) of the servo sector SS(i,j) caused by a disk shifting distance d in the radial direction of the disk. K is a constant of proportionality specific to each disk drive. As a matter of course, the signals have a sine wave, respectively, due to each of the internal variable values PF(1), PF(2), . . . and due to each of the displacements Δr(1), Δr(2), . . . of the radius.

While the VCM control current value CNTF(i) filtered with the above peak filter and supplied to the VCM driver 4 includes an internal variable value PF(i) proportional to the displacement Δr(i) of the above radius caused by disk shifting in such a way, the position of the head $H(k_T)$in the radial direction of the disk can be compensated by the internal variable value DPF(i) according to the change of the above radius even when the radius of the target position in the target track $T(j_T)$ is changed from the disk rotation center due to disk shifting. Accordingly, the head $H(k_T)$ can follow the target position in the target track $T(j_T)$.

Chance of Time Interval between Servo Sectors due to Disk Shifting

Whenever disk shifting occurs, it causes the radius of the servo sectors SS(1,j), SS(2,j), . . . to be changed from the disk rotation center, and the time interval to be changed between the servo areas SF(i) and SF(i+1) (i.e., the time interval between passing of the servo area SF(i) and passing of the next servo area SF(i+1) under the head $H(k_T)$ respectively). Consequently, the time interval between the servo sector SS(i,j) and SS(i+1,j) is changed. The time interval change becomes a change of the position of the servo sector SS on the time axis in a signal read by the head $H(k_T)$. When disk shifting occurs in such a way, therefore, the position of the servo sector SS is changed not only in the radial direction of the disk, but also in the circumferential direction of the disk (i.e., track direction and time axis direction).

Figure 4:
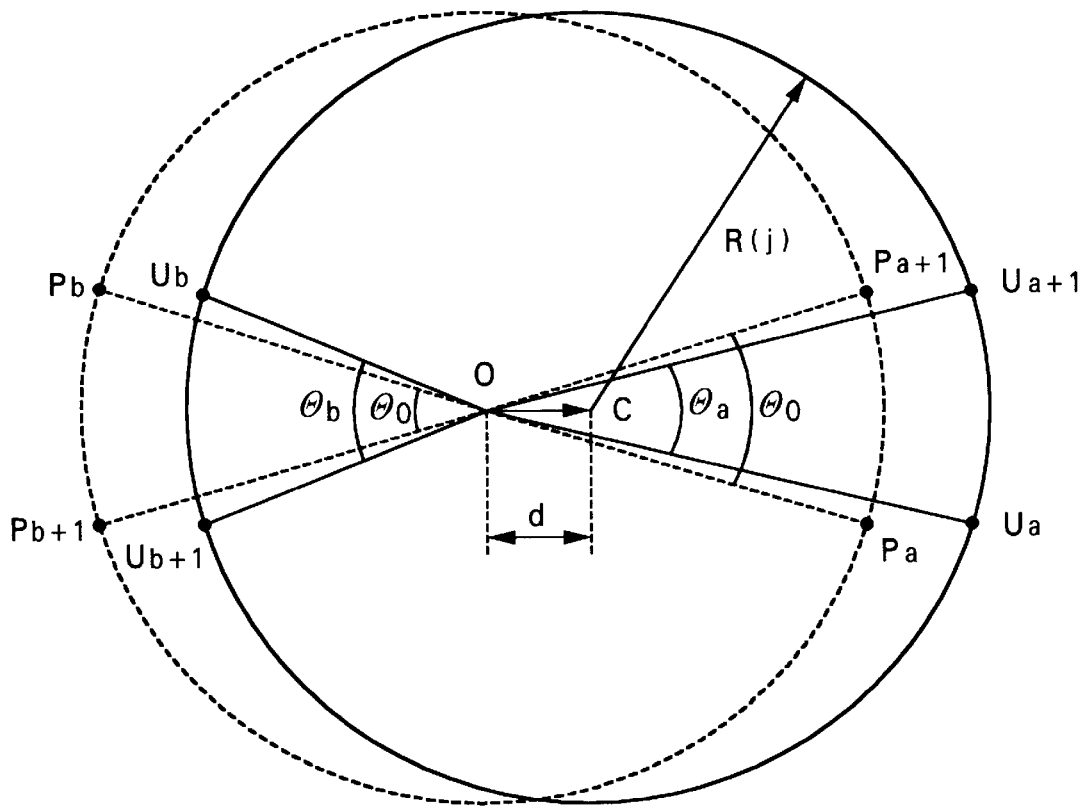
FIG. 4 shows a time interval between servo sectors, changed due to disk shifting in accordance with the invention.

FIG. 4 shows a change of a time interval between servo sectors to occur due to disk shifting. In FIG. 4, O denotes the disk rotation center (spindle shaft rotation center), C denotes the track center (servo information writing center), R(j) denotes the radius of the track T(j) from the track center C, d denotes a disk shifting distance (distance between O and C), $P_a$, $P_{a+1}$, $P_b$, and $P_{b+1}$ denote positions of servo sectors $SS(i_a,j)$, $SS(i_a+1, j)$, $SS(i_b, j)$, and $SS(i_b+1,j)$ when no disk shifting occurs, respectively. $U_a$, $U_{a+1}$, $U_b$, and $U_{b+1}$ denote positions of servo sectors $SS(i_a,j)$, $SS(i_a+1,j)$, $SS(i_b,j)$, and $SS(i_b+1,j)$ when disk shifting occurs, respectively.

When no disk shifting occurs (in case both centers O and C match), the q is calculated as follows:

$$DP_aOP_{a+1}=DP_bOP_{b+1}=q$$

When disk shifting occurs, however, as shown in FIG. 4 the q is calculated respectively as follows:

$$\angle U_aOU_{a+1}=q_a<q$$

$$\angle U_bOU_{b+1}=q_b>q$$

Because the disk D (spindle motor 1) rotates at a uniform speed (e.g., rotation at an uniform angular speed), the time interval between servo sectors $SS(i_a,j)$ and $SS(i_a+1,j)$ is shorter than the time interval between servo sectors $SS(i_b,j)$ and $SS(i_b+1,j)$. Thus, when disk shifting occurs as shown in FIG. 4, the radius $|OU_a|$ of the servo sector $SS(i_a,j)$ from the disk rotation center O becomes larger than the radius $|OU_b|$ of the servo sector $SS(i_b,j)$ from the disk rotation center O.

When the premise that the disk rotates at a uniform speed of $f_o[s^{-1}]$ (rpm) and $TS_0=1/(f_o'N)$ is satisfied, the time interval $TS(i,j)$ between the servo sector $SS(i,j)$ and the servo area $SF(i+1)$ (servo sector $SS(i+1,j)$ of $SF(i+1)$ during track following) is calculated as follows:

$$TS(i,j)=TS_0'R(j)/r(i,j)=TS_0'R(j)/\{R(j)+\Delta r(i)\} \quad (3)$$

$$=TS_0+[TS_0'R(j)/\{R(j)+\Delta r(i)\}]-TS_0$$

$$=TS_0-[TS_0'\Delta r(i)/\{R(j)+\Delta r(i)\}]$$

$$=TS_0+DTS(i,j)$$

Furthermore, from the above expression (2) and expression (3), the expression (4) is derived as follows:

$$TS(i,j)=TS_0'R(j)/\{R(j)+K'PF(i)\} \quad (4)$$

The change $DTS(i,j)$ of the time interval $TS(i,j)$ between the servo sectors $SS(i,j)$ and $SS(i+1,j)$ is in inverse proportion to the track radius $R(j)$, so the change of the time interval between servo sectors becomes larger as it goes closer to the inside diameter of the disk D. The signal has a sine wave due to each of the internal variable values $PF(1)$, $PF(2)$, . . . , and the signal also has a sine wave due to each time interval $TS(1,j)$, $TS(2,j)$, . . . between servo sectors, since it is calculated utilizing the above expression (4).

Figure 5:
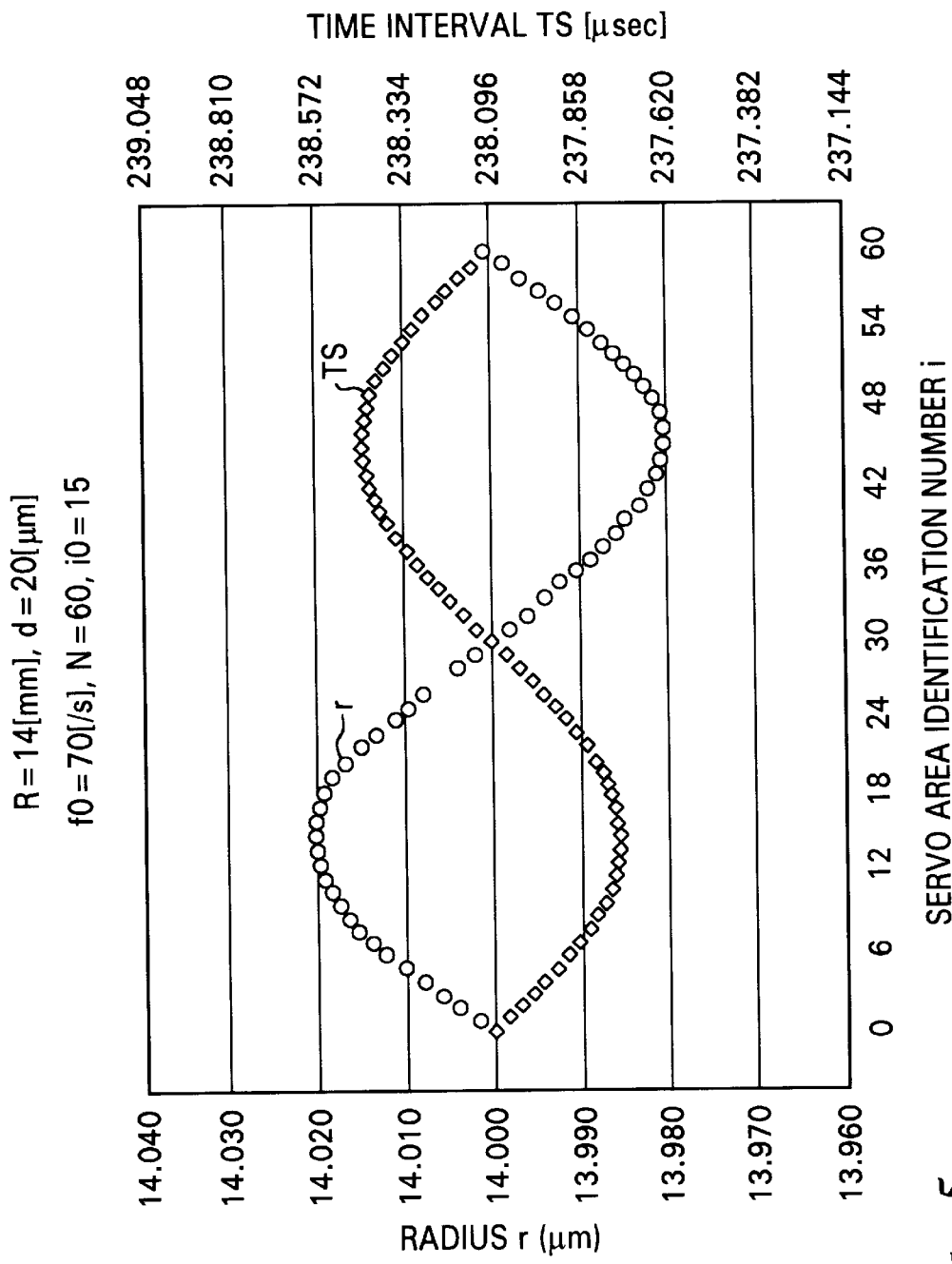
FIG. 5 shows a time interval between servo sectors, changed in one revolution of the subject disk and a change of the radius from the center of the disk rotation in accordance with an embodiment of the invention.

FIG. 5 shows a change of the time interval TS between servo sectors in one round of the disk and a change of the radius r of servo sectors from the disk rotation center O. In FIG. 5, it is assigned that the disk is a 2.5-inch disk, the track radius R is 14 [mm], the disk shifting distance d is 20 [mm], the disk rotational speed $f_0$ is 70 [/s], and the servo area identification number $i_0$ in the disk shifting direction is 15 for calculating each change.

Figure 6:
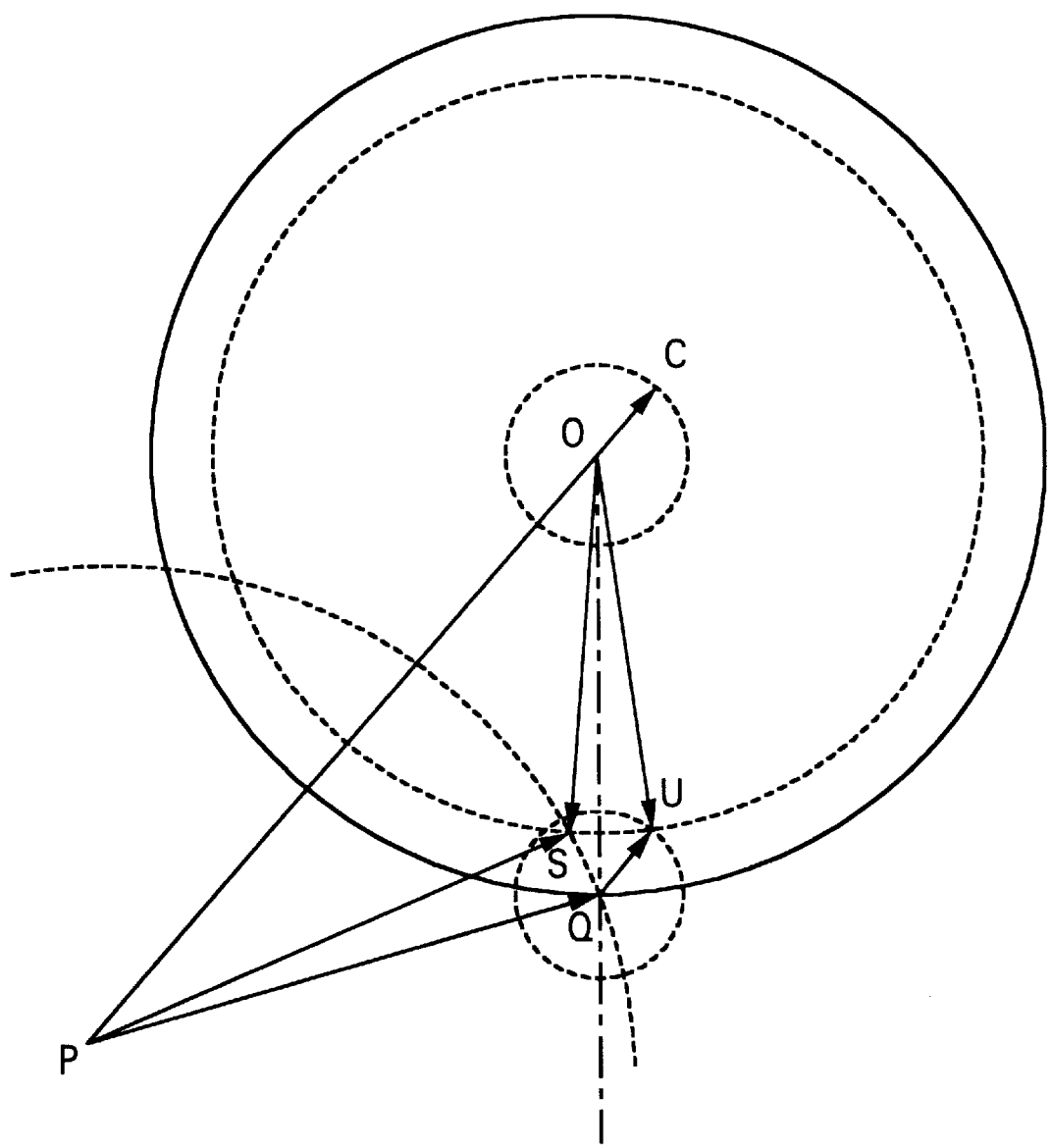
FIG. 6 shows how a time interval between servo sectors is calculated according to one preferred embodiment of the invention.

FIG. 6 shows how a time interval between servo sectors is calculated. In FIG. 6, O denotes the disk rotation center (spindle shaft rotation center), P denotes the circling center of the access mechanism 2, Q is the position of the servo sector $SS(i,j)$ when no disk shifting occurs, U denotes the position of the servo sector $SS(i,j)$ when disk shifting occurs, C denotes the center of the track $T(j)$ (center of servo information writing) when disk shifting occurs. Also according to FIG. 6 $|OP|=a$, $|PQ|=b$, $|OQ|=C$, $|QU|=d$, and $\angle QOC=$wt are satisfied. Here, $\omega=2pf_0$ (p: the ratio of the circumference of a circle to its diameter, $f_0$: disk rotational speed (rpm), unit: [/s]) is satisfied. And, t denotes a time and S denotes an intersection point of a circle passing R around O and a circle passing Q around P (a locus of the head $H(k_T)$).

In FIG. 6, where $|OP|=e$, e is calculated as follows:

$$e=\{c^2+d^2+2'c'd\cos(wt)\}^{1/2}$$

At first, $\angle QOC$ is found as follows:

$$\angle QOC=\arccos\{(c^2+e^2-d^2)/(2'c'e)\}$$

This $\angle QOC$ becomes a function of the time t.

Next, $\angle POQ$ and $\angle POS$ are calculated as follows so as to find $\angle QOS(=\angle POQ-\angle POS)$.

$$\angle POQ=\arccos\{(c^2+a^2-b^2)/(2'c'a)\}$$

$$\angle POS=\arccos\{(e^2+a^2-b^2)/(2'e'a)\}$$

Consequently, $\angle SOU$ is calculated as follows:

$$\angle SOU=\angle QOU+\angle QOS=\angle QOU+\angle POQ-\angle POS$$

The $\angle SOU$ also becomes a function of the time t.

When no consideration is taken for the displacement of the head $H(k_T)$ in the circumferential direction of the disk in accordance with the compensation by the internal variable value PF of the peak filter, the time change $t(t)$ at the time t is calculated as follows:

$$\tau(t)=\angle QOU/\omega$$

In case it is assumed that the number of servo areas is N and the servo sector $SS(i,j)$ passes under the head $H(k_T)$ at a time ti, the time interval $TS(i,j)$ between servo sectors $SS(i,j)$ and $SS(i+1,j)$ is calculated as follows:

$$TS(i,j)=1/(f_o'N)+\tau\{t_i+(1/f_o'N\}-\tau(t_i)$$

This $TS(i,j)$ is equivalent to TS shown in FIG. 5.

When consideration is taken for the displacement of the head $H(k_T)$ in the circumferential direction of the disk in accordance with the compensation by the above internal variable value PF, the time change $t(t)$ at the time t is calculated as follows:

$$t_i(t)=\Delta \angle SOU/\omega$$

When it is assumed that the servo sector $SS(i,j)$ passes under the head $H(k_T)$ at a time $t_i$, the time interval $Ts_i(i,j)$ between servo sectors $SS(i,j)$ and $SS(i+1,j)$ is calculated as follows:

$$TS_1(i,j)=1/(f_o'N)+t_1\{t_i+(1/f_o'N)\}-t_1(t_i)$$

Figure 7:
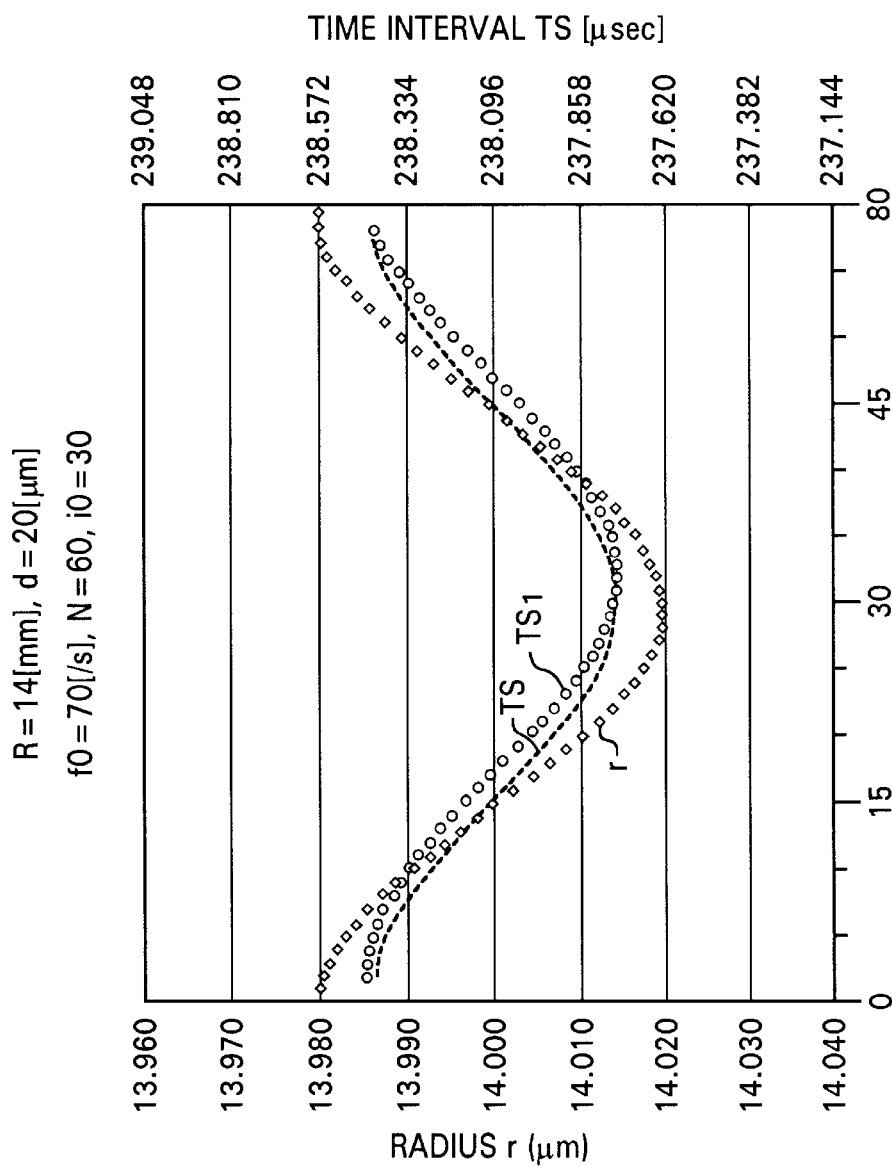
FIG. 7 shows a time interval between servo sectors in one revolution of a disk when the displacement of the head in the circumferential direction is not taken into consideration and when it is taken into consideration in accordance with one embodiment of the invention.

FIG. 7 shows two cases of a time interval between servo sectors in one round of the disk, when the displacement of the head in the circumferential direction of the disk is taken into consideration and when the displacement is not taken into consideration. In FIG. 7, TS denotes a time interval between servo sectors, determined by the above time change $t(t)=\angle QDU/\omega$ when the displacement of the head in the circumferential direction of the disk is not taken into consideration. $TS_i$ denotes a time interval between servo sectors, decided by the above time change $t_i(t)=\angle SOU/\omega$ when the displacement of the head in the circumferential direction of the disk is taken into consideration. Also, r denotes a change of the radius of the servo sectors from the disk rotation center O. The time intervals TS and $TS_i$, as well as the radius r are calculated assuming the track radius 14 mm, the disk shifting distance d=20 mm, the disk rotational speed $f_o$=70 [/s], and the servo area identification number in the disk shifting direction $i_0$=30.

In FIG. 7, there is almost no difference between the time intervals TS and $TS_i$. For TS, the displacement of the head is not taken into consideration. For $TS_i$, the displacement of the head is taken into consideration. However, the phase is slightly shifted between TS and $TS_i$.

Compensation of Disk Position in the Circumferential Direction (Time Axis Direction) against Disk Shifting in Controlling Procedure of the Servo Information Detection Timing in the First Embodiment As described with reference to FIGS. 4 through 7, when disk shifting occurs, the time interval between servo sectors is changed. To avoid such the problem, therefore, in the disk drive in the first embodiment, the time interval TS for detecting servo information in a signal read by the head is not fixed to the initial value $TS_0$, while it has been fixed conventionally. The time interval TS(i,j) between servo sectors SS(i,j) and SS(i+1,j) is calculated by the above expression (3) according to the displacement Δr(i) of the servo area SF(i) in the radial direction of the disk, the track radius R(j), and the initial value $TS_0$. Then, the time interval for detecting servo information is adjusted on the basis of this calculated time interval TS(i,j).

More concretely, the displacement Δr(i) in the radial direction of the disk can be found from the internal variable value PF(i) with use of expression (2). The time interval TS(i,j) can be found from the internal variable value PF(i) with use of expression (4) derived from the expressions (2) and (3).

In the disk drive in the first embodiment, the time interval for detecting servo information means a time interval for setting a search window used to detect a servo address mark SAM. Thus, the time interval for setting the above search window is not fixed to the initial value $TS_0$, but is compensated according to the change of the time interval between servo sectors, caused by disk shifting.

Furthermore, the time interval TS(i,j) is calculated according to the displacement Δr(i) in the radial direction of the disk, which is calculated with use of the servo information of the detected servo sector SS(i,j) in a disk rotation. The time interval between detection of the servo information of the servo sector SS(i,j) according to the time interval TS(i,j) and detection of the servo information of. the next servo sector (i+1,j) is adjusted. More concretely, the time interval TS(i,j) is calculated according to the displacement Δr(i), which is calculated and updated as needed each time servo information is detected, and the time interval TS(i,j) is reflected on the time interval of the servo information of the servo sectors SS(i,j) and SS(i+1,j).

FIG. 8 shows a controlling procedure for a servo information detection timing in the first embodiment. As shown in FIG. 8(a), when the displacement Δr(i) of the radius of the servo area SF(i) is 0, the time interval TS(i,j) between servo sectors SS(i,j) and SS(i+1,j) is $TS_0$. Thus, the search window SW(i) for detecting the SAM of the servo area SF(i) is set for a signal read by the head, and then the next search window SW(i+1) for detecting the SAM of the next servo area SF(i+1) is set in a time $TS_0$ after that.

As shown in FIG. 8(b), when the displacement of the radius Δr (i)>0 is satisfied, the time interval displacement DTS (i,j)<0 is satisfied. The time interval TS(i,j) between servo sectors SS(i,j) and SS(i+1,j) becomes shorter than the initial value $TS_0$. Thus, after a search window SW(i) is set, another search window SW(i+1) is set in a time $TS_0$+ΔTS (i,j) (<$TS_0$) following that.

On the contrary, as shown in FIG. 8(c), in case the radius displacement Δr (i)<0 is satisfied, the time interval displacement DTS(i,j)>0 is satisfied and the time interval TS(i,j) between servo sectors SS(i,j) and SS(i+1,j) becomes longer than the initial value $TS_0$. Thus, after a search window SW(i) is set, another search window SW(i+1) is set in a time $TS_0$+DTS(i,j) (>$TS_0$) after that.

Figure 9:
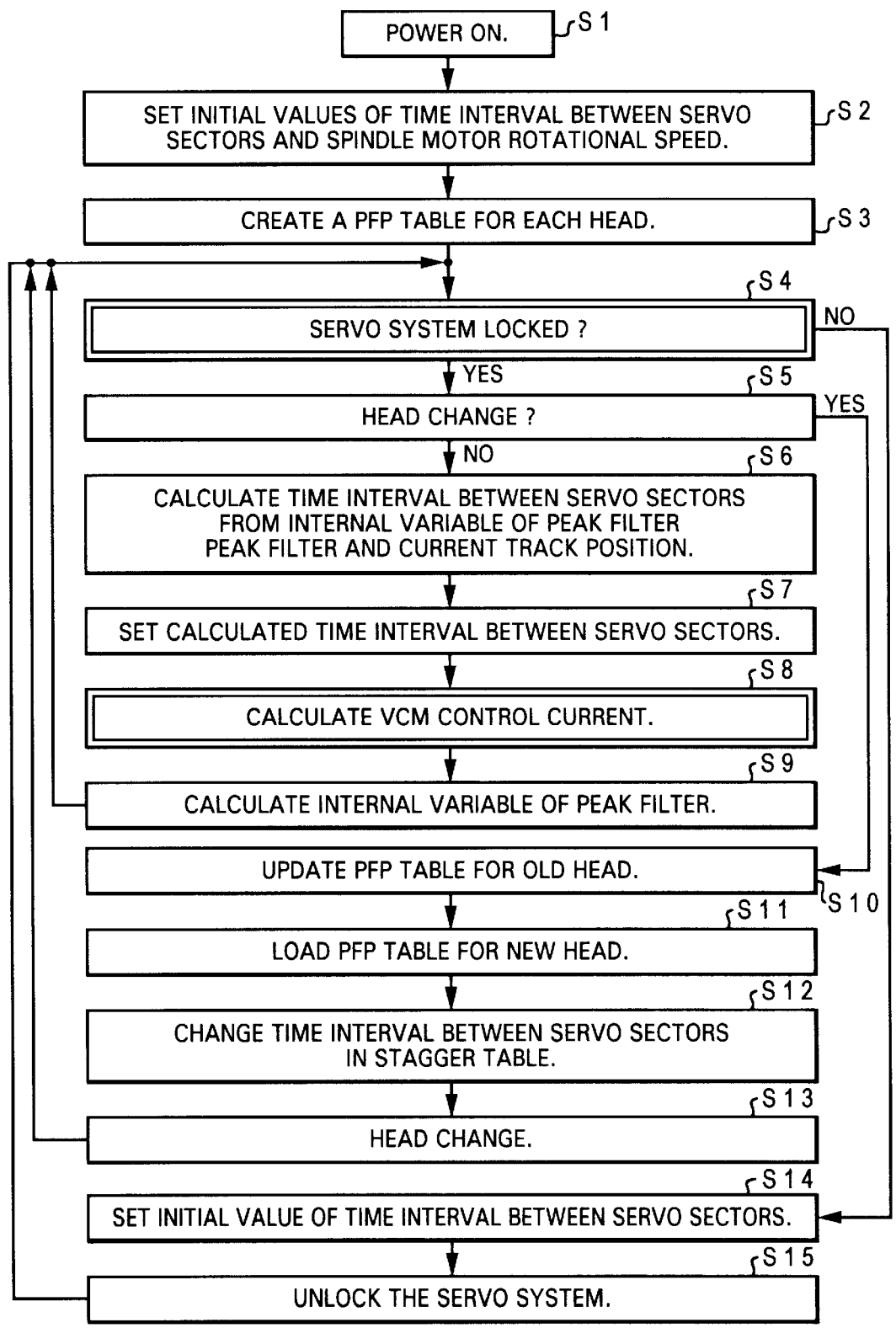
FIG. 9 is a flowchart of a process for controlling a servo system in the servo information detection timing control procedure in the first embodiment of the present invention.

Controlling Servo System in the Servo Information Detection Timing Controlling Procedure in the First Embodiment FIG. 9 is a flowchart for controlling a servo system in the control procedure of the servo information detection timing in the first embodiment of the present invention. The control procedure shown in FIG. 9 employs a method for calculating the time interval TS(i,j) between servo sectors according to the internal variable value PF(i) of the peak filter, which is calculated and updated as needed.

Power ON Controlling Procedure

Here, a description is made of a power-on controlling procedure in steps S1 to S3 in FIG. 9. When the disk drive 100 is powered in step S1, the MPU 11 sets the initial value $TS_0$ in the HDC 12 as a time interval TS between servo sectors in step S2. The MPU 11 then sets the initial value $f_0$ in the spindle driver 2 as a rotational speed f (rpm) of the spindle motor 1. The initial value $TS_0$ is set beforehand according to the rotational speed of the spindle motor 1 (that is, the rotational speed of the disk D) and the number of servo areas SF. When the disk rotational speed f is 70 [/s] and the number of servo areas SF N is 60, the initial value is about 238 [ms].

Next, a peak filter parameter table (PFP table) is created for each head H in step S3. The PFP table has peak filter parameters for each head H and the table is stored in the RAM 6. The above parameters are parameters for a gain denoting a disk shifting distance and a phase denoting the direction in which the disk is shifting.

In the PFP table are written the peak value of the peak filter's internal variable value PF in one rotation of the disk as the above gain, as well as, for example, a servo area identification number of servo sectors SS as the above phase. For the servo sectors SS, the sign of the internal variable value PF in one rotation of the disk is changed from minus to plus.

The PFP table is created in the following procedure. At first, the MPU 11 calculates the internal variables value PF(1), PF(2), . . . in one rotation of the disk with respect to an active head. Then the MPU 11 extracts the parameters of the peak filter from the values in those internal variables and records the parameters in the PFP table. The MPU 11 then changes the head to another active head and repeats the above processing steps to extract the parameters of the peak filter and records them in the PFP table. By this method, active heads are changed one after another to extract the parameters of the peak filter and record them in the PFP table with respect to each head. The PFP table is thus created.

Servo Controlling Procedure

A description is now provided of a servo controlling procedure from step S4 to S9 shown in FIG. 9. First, in Step S4, it is determined whether or not the servo system is locked. The HDC 12 then sets a search window SW for a signal read by the head H and detects a servo address mark SAM from the signal in this search window. If the HDC 12 detects the SAM, the HDC 12 decides that the servo system is locked and goes to step S5. If no SAM is detected, the HDC 12 decides that the servo system is not locked (unlocked) and goes to step S14.

If the servo system is locked, the MPU 11 decides whether to change the head in step S5. When the head is not to be changed, the MPU 11 goes to step S6. When the head is to be changed, the MPU 11 goes to step S10.

When no head change is done, the MPU 11 calculates the time interval $TS(i,j)=TS_0+\Delta TS(i,j)$ between the servo sectors $SS(i,j)$ and $SS(i+1,j)$ utilizing of the above expression (4) according to the internal variable value $PF(i)$ of the peak filter, which is calculated from the VCM control current values $CNTF(i-1)$ and the $CNTF(i-2)$ utilizing the above expression (1) and the radius $R(j)$ of the track $T(j)$ in which the head $H(k_T)$ is currently positioned. Then, the MPU 11 sets the above calculated time interval $TS(i)$ in the HDC 12 in step S7.

On the other hand, the HDC 12 samples the servo information in the servo area $SF(i)$ from a signal read by the head H in step S8 and calculates the PES value $P(i)$, the VCM control current value $CNT(i)$, and the filtered VCM control current value $CNTF(i)$ sequentially according to this servo information in the SA 13 and supplies this filtered VCM control current value $CNTF(i)$ to the VCM driver 4.

Next, the MPU 11 calculates the internal variable value $PF(i+1)$ of the peak filter from the VCM control current values $CNTF(i)$ and the $CNTF(i-1)$ in step S9 with use of the above expression (1). The process then returns to step S4.

In step S4, the HDC 12 compensates the timing for setting the search window $SW(i+1)$ according to the above time interval $TS(i,j)$ Concretely, the HDC 12 sets the search window $SW(i+1)$ a time $TS(i)$ after the search window $SW(i)$ is set. Then, the HDC 12 searches a servo address mark SAM in the search window $SW(i+1)$ set at a time in accordance with the above time interval $TS(i,j)$. According to whether or not the SAM is detected, the HDC 12 decides whether or not the servo system is locked. Consequently, the HDC 12 can detect the servo address mark SAM of the servo area $SF(i+1)$ surely and stably. The HDC 12 can also detect the servo information of the servo area $SF(i+1)$ surely and stably.

Unlocking Processing

Here, a description is provided of a processing that unlocks the servo system in steps S14 and 15 shown in FIG. 9. If it is decided in step S4 of FIG. 9 that the servo system is unlocked, the MPU 11 sets the initial value $TS_0$ in the HDC 4 as a time interval TS between servo sectors in step S14. Next, the MPU 11 controls the HDC 12 so as to make the HDC 12 detect the servo address mark SAM from every area of the signal read by the head H, thereby unlocking the servo system without setting any search window SW in step S15. The MPU 11, when detecting the SAM in step S14 successfully, resets the controlling of the HDC 12 to unlock the servo system. The process then returns to step S4.

Consequently, the HDC 12 sets a search window SW for a signal read by the head H at a timing in accordance with the initial value $TS_0$ of the time interval in step S4 and searches a SAM from this search window SW. When the SAM is detected correctly in the unlocking processing in step S15, the HDC 12 can detect the SAM of the next servo sector SS in step S4. Thereby the HDC 12 can decide that the servo system is locked. If wrong data is detected as a SAM in the unlocking processing in step S13 (for example, in case the user data recorded in the data sector SD is detected as a SAM), the HDC 12 cannot detect the SAM in step S4, and therefore, the HDC 12 decides that the servo is still unlocked.

While the servo system is unlocked, the controller cannot detect servo information. Thus, the controller cannot recognize the servo area identification number of any servo sector SS passing under the head $H(k_T)$. The time interval TS between servo sectors in one rotation of the disk is changed around the initial value $TS_0$. because of this, the controller 10 sets the initial value $TS_0$ in the HDC 12 as a time interval TS in step S13 so that a search window SW, just after an unlocking processing, is set according to the initial value $TS_0$, which is the center value of the change of the above time interval. The search window SW is not set according to a value around the peak value of the change of the above time interval. Consequently, situations wherein just after an unlocking processing, the time interval of the search window SW is compensated in a direction opposite to the actual change of the above time interval, preventing the SAM from being detected can be avoided.

Head Changing Procedure

A description is now provided of a procedure for changing heads in step S10 to S13 shown in FIG. 9. The above head change is done only when a servo lock state is detected in step S4. When a servo unlock state is detected in step S4, the head change is not done until the servo system is locked. Concretely, the head change is done only when the MPU 11 recognizes the servo area identification number i of a servo area SF passing under the head $H(k_T)$ If a head change is completed in step S5 of FIG. 9, the MPU 11 writes parameters of the peak filter (the peak value and the phase of internal variable values PF in one rotation of the disk) for the head $H(k_1)$ before the head change in the PFP table to update the PFP table in step S10. Because the internal variable values PF in one rotation of the disk take a sine wave, respectively, the controller 10 can calculate the internal variable values PF(1), PF(2), . . . in one rotation of the disk when both peak value and phase are known.

Next, the MPU 11 loads the parameters of the peak filter for the head $H(k_2)$ from the PFP table in step S11 after the head change. Then, in step S12, the MPU 11 loads the servo area misalignment time TSC between disk surfaces $DS(k_1)$ and $DS(k_2)$ from the stagger table and sets $TS_0+TSC$ obtained by adding a misalignment time TSC to the initial value $TS_0$ of the time interval in the HDC 12 as a time interval between the servo area $SF(i)$ of the disk surface $DS(k_1)$ and the servo area $SF(i\_1)$ of the disk surface $DS(k_2)$. After that, the MPU 11 controls the RWC 5 to change the active head $H(k_1)$ to the active head $H(k_2)$ in step S13. The process then returns to step S4. In step S4, the HDC 12 sets a search window SW (i) for detecting the servo address mark SAM of the servo area SF(i) on the disk surface DS($k_1$) for a signal read by the head H($k_1$), then sets the next search window SW(i+1) for detecting the SAM of the next servo area SF(i+1) on the disk surface DS($k_2$) for another signal read by the head H($k_2$) for a time $TS_0$+TSC after that. Then, the HDC 12 searches a SAM in this search window SW(i+1) and according to the result (i.e., whether or not the SAM is detected), the HDC 12 knows whether or not the servo system is locked.

If the servo system is locked in step S4, the MPU 11 calculates the time interval TS(i+1) between servo sectors SS(i+1,j) and SS(i+2,j) on the disk surface DS($k_2$) from the internal variable value PF(i+1) of the peak filter using the above expression (4). To obtain the internal variable value PF(i+1) here with use of the above expression (1), the internal variable values PF(i) and PF(i−1) of the disk surface DS($k_2$) are required. Thus, the MPU 11 calculates the internal variable value PF(i−1) from the parameters of the peak filter loaded in step S10 or calculates the internal variable values PF(i) and PF(i+1) from the loaded parameters of the peak filter, thereby calculating the internal variable value PF(i+1) using the value and the above expression (1).

In step S8, the HDC 12 calculates the PES value P(i+1), the VCM control current value CNT(i+1), sequentially in SA13, according to the servo information of the servo area SF(i+1) sampled from a signal read by the head H($k_2$), and the filtered VCM control current value CNTF(i+1) is supplied to the VCM driver 4.

Figure 10:
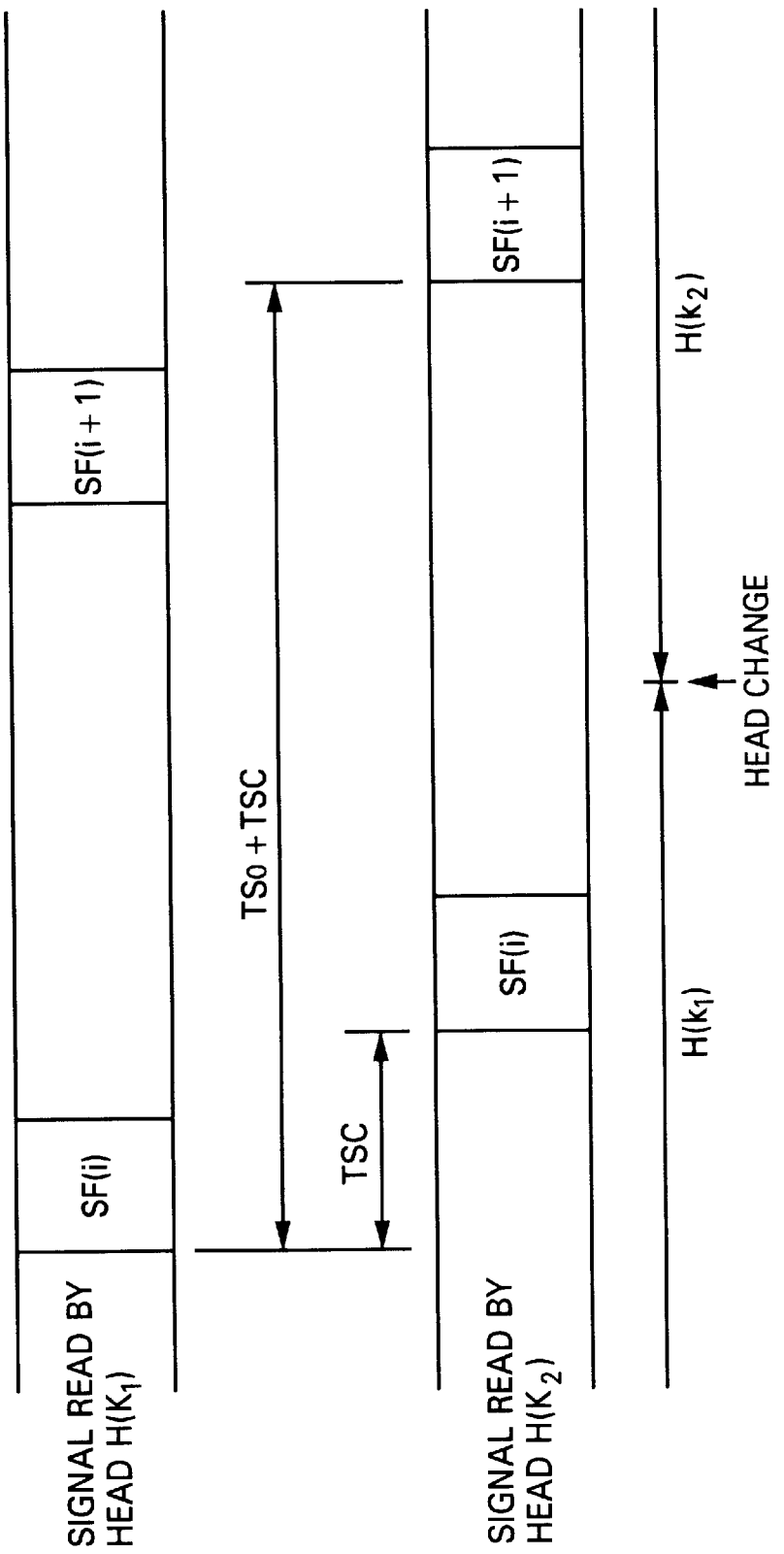
FIG. 10 is an example of a head change in a disk drive according to one embodiment of the invention.

FIG. 10 shows an example of such a head change. In the following description for the head change, it is premised that the head H($k_1$) is changed to the head H($k_2$) as shown in FIG. 10 and the head change is done after the head H($k_1$) passes the servo area SF (i) of the disk surface DS($k_1$) and the first search window SW is set in the servo area SF(i+1) of the disk surface DS($k_2$) after the head change. The time interval between the servo area SF(i) of the disk surface DS($k_1$) and the servo area SF(i+1) of the disk surface DS($k_2$) is assumed to be $TS_0$+TSC when no disk shifting occurs. After a head change, it is possible to set the first search window SW in the servo area SF(i) of the disk surface DS($k_2$). In this case, the time interval between the servo area SF(i) of the disk surface DS($k_1$) and the servo area SF(i) of the disk surface DS($k_2$) is assumed to be TSC when no disk shifting occurs. Here, the TSC is a time corresponding to a misalignment of servo areas SF on the disk surfaces DS($k_1$) and DS($k_2$). The misalignment time TSC between servo areas on those disk surfaces can be loaded from a stagger table stored in the ROM 15 beforehand.

If a head change is done in step S5 shown in FIG. 9, the MPU 11 writes parameters of the peak filter (the peak value and the phase of internal variable values PF in one rotation of the disk) for the head H($k_1$) before the head change in the PFP table so as to update the PFP table in step S10. Because the internal variable values PF in one rotation of the disk take a sine wave respectively, the controller 10 can calculate the internal variable values PF(1), PF(2), . . . in one rotation of the disk in case both peak value and phase are known.

Next, the MPU 11 loads the parameters of the peak filter for the head H($k_2$) from the PFP table in step S11 after the head change.

Then, in step S12, the MPU 11 loads the servo area misalignment time TSC between disk surfaces DS($k_1$) and DS($k_2$) from the stagger table and sets $TS_0$+TSC obtained by adding a misalignment time TSC to the initial value $TS_0$ of the time interval in the HDC 12 as a time interval between the servo area SF(i) of the disk surface DS($k_1$) and the servo area SF(i+1) of the disk surface DS($k_2$).

After that, the MPU 11 controls the RWC 5 so as to change the active head H($k_1$) to the active head H($k_2$) in step S13, then returns to step S4.

In step S4, the HDC 12 sets a search window SW(i) for detecting the servo address mark SAM of the servo area SF(i) on the disk surface DS($k_1$) for a signal read by the head H($k_1$), then sets the next search window SW(i+1) for detecting the SAM of the next servo area SF(i+1) on the disk surface DS($k_2$) for another signal read by the head H($k_2$) for a time $TS_0$+TSC after that. Then, the HDC 12 searches a SAM in this search window SW(i+1) and according to the result (whether or not the SAM is detected), the HDC 12 can know whether or not the servo system is locked.

In case the servo system is locked in step S4, the MPU 11 calculates the time interval TS(i+1) between servo sectors SS(i+1,j) and SS(i+2,j) on the disk surface DS($k_2$) from the internal variable value PF(i+1) of the peak filter with use of the above expression (4). To obtain the internal variable value PF(i+1) here with use of the above expression (1), the internal variable values PF(i) and PF(i−1) of the disk surface DS($k_2$) are required. Thus, the MPU 11 calculates the internal variable value PF(i−1) from the parameters of the peak filter loaded in step S10 or calculates the internal variable values PF(i) and PF(i+1) from the loaded parameters of the peak filter, thereby calculating the internal variable value PF(i+1) with use of the value and with use of the above expression (1).

In step S8, the HDC 12 calculates the PES value P(i+1), the VCM control current value CNT(i+1), and the filtered VCM control current value CNTF(i+1) sequentially in SA13, according to the servo information of the servo area SF(i+1) sampled from a signal read by the head H($k_2$) and supplies the filtered VCM control current value CNTF(i+1) to the VCM driver 4.

As described above, according to the first embodiment, therefore, it is possible to detect servo information surely and stably even when disk shifting occurs, since the time interval TS(i,j) between servo sectors SS(i,j) and SS(i+1,j) is calculated according to the peak filter's internal variable value PF(i), then the time interval for detecting the next servo information is adjusted according to this calculated time interval TS(i,j).

Furthermore, because the time interval TS(i,j) is calculated according to the peak filter's internal variable value PF(i) that is calculated and updated as needed each time servo information is detected, the difference between the calculated time interval and the actual time interval can be reduced. As a result, the detection accuracy of servo information can be more improved.

Second Embodiment

In the second embodiment to be described below, peak filter's internal variable values PF(1), PF(2), . . . in one revolution of the disk are set beforehand in an internal variable table. The internal variable values PF(1), PF(2), . . . are already calculated in one revolution of the disk in the past. And, those internal variable values set in the internal variable table are used to calculate the time intervals TS(1), TS(2), . . . . between servo sectors respectively. The above internal variable table is updated when the disk drive is powered or/and a head change is done.

Figure 11:
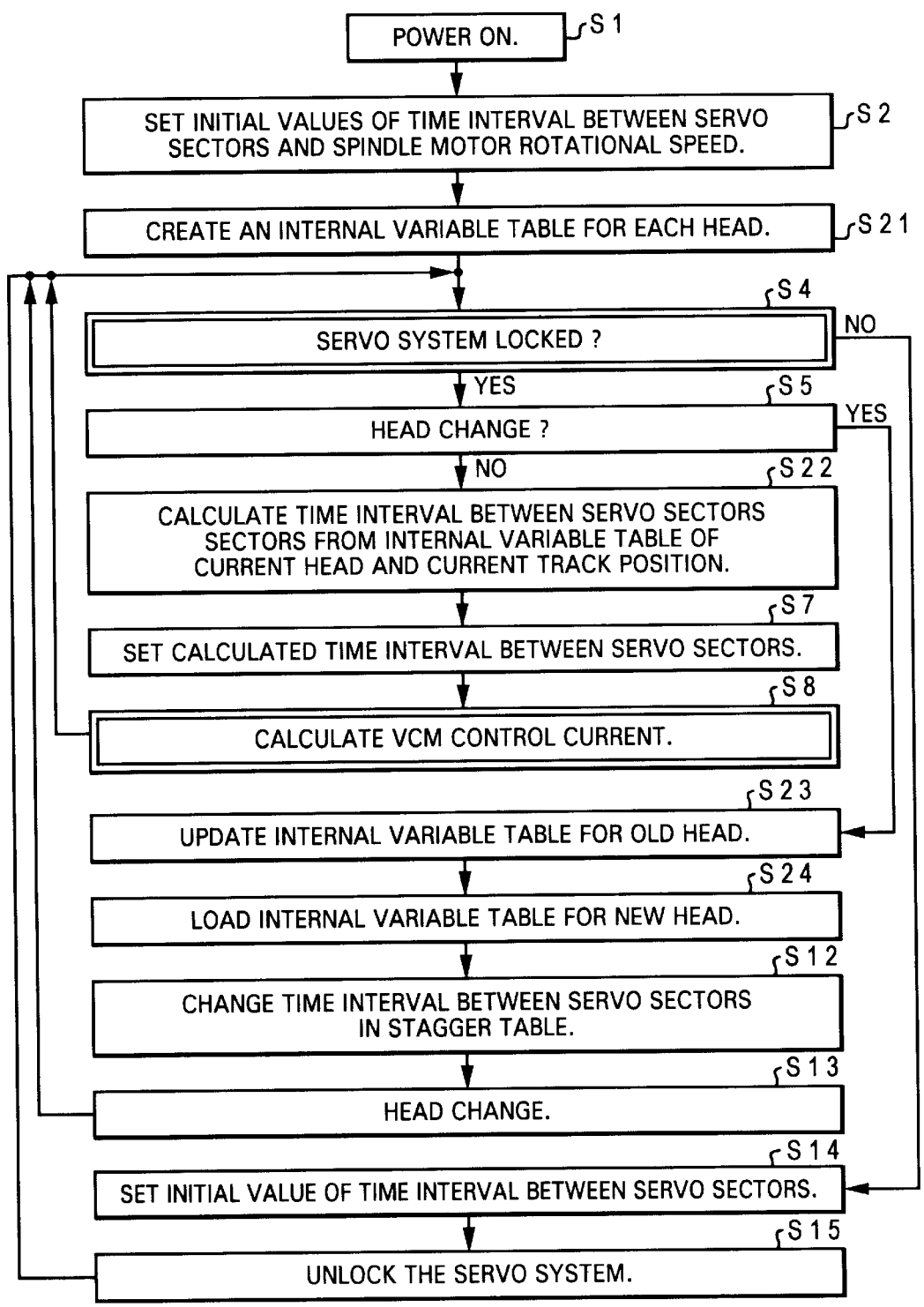
FIG. 11 is a flowchart of a process for controlling a servo system in the servo information detection timing controlling procedure in a second embodiment of the present invention.

FIG. 11 is a flowchart for controlling a servo system in the controlling procedure of the servo information detection timing in the first embodiment of the present invention. The procedure in FIG. 11 employs a method for calculating a time interval TS(i,j) between servo sectors according to an already calculated internal variable value of the peak filter. In FIG. 11, the same numbers are given to the same steps as those shown in FIG. 9, avoiding redundant description. The configuration of the disk drive in this second embodiment is the same as the disk drive 100 (see FIG. 1) in the first embodiment.

Power-ON Controlling Procedure

In step S3, the MPU 11 sets the initial value $TS_0$ of the time interval TS between servo sectors in the HDC 12 and sets the initial value $f_0$ of the rotational speed (rpm) f of the spindle motor 1 in the spindle driver 2 in step S3, then creates an internal variable table for the peak filter for each head H in step S21. This internal variable table has internal variable values DPF(1), DPF(2), ... of the peak filter for each head H(k) (that is, for each disk surface DS(k)) and the table is held in the RAM 6. This internal variable table is created in the same procedure as that of the PFP table in the first embodiment (refer to step S3 shown in FIG. 9) while active heads are changed sequentially.

Servo Controlling Procedure

In case the servo system is locked in step S4 and no head change is done in step S5, the MPU 11 reads the internal variable value DPF(i) from the internal variable table in step S22 and calculates the time interval compensation value between servo sectors SS(i,j) and SS(i+1,j) $TS(i,j)=TS_0+DTS(i,j)$ from this internal variable value DPF(i) and the radius R(j) of the track T(j) in which the head is currently positioned with use of the above expression (4) in step S22.

Then, the MPU 11 sets the calculated time interval compensation value t(i,j) in the HDC 12 in step S7.

In step S8, the HDC 12 calculates the PES value P(i), the VCM control current value CNT(i), the filtered VCM control current value CNTF(i) sequentially in SA 13 and supplies the VCM control current value CNTF(i) to the VCM driver 4 and returns to step S4.

Head Change Procedure

To change heads in step S5, at first the MPU 11 calculates the internal variable values PF(1), PF(2), ... of the peak filter for the head $H(k_1)$ before the head change with use of the above expression (1) in step S23 so as to update the internal variable table.

Next, the MPU 11 loads the peak filter's internal variable values PF(1), PF(2), ... for the head $H(k_2)$ from the internal variable table after the head change in step S24.

After that, the MPU 11 sets $TS_0+TSC$ obtained by adding a servo area misalignment time TSC to the initial value $TS_0$ of the time interval in the HDC 12 as the time interval between the servo area SF(i) on the disk surface $DS(k_1)$ and the servo area SF(i+1) on the disk surface $DS(k_2)$ in step S12, then changes the active heads from $H(k_1)$ to $H(k_2)$ in step S13. The MPU 11 then returns to step S4.

According to the second embodiment as described above, therefore, it is possible to detect servo information surely and stably by calculating the time interval TS(i,j) between servo sectors SS(i,j) and SS(i+1,j) according to the peak filter's internal variable value PF(i), thereby adjusting the time interval for detecting servo information according to this time interval TS(i,j) even when disk shifting occurs.

Furthermore, it is possible to simplify the servo controlling procedure more than that in the above first embodiment, since the time interval TS(i,j) is calculated according to the peak filter's internal variable value PF(i) calculated beforehand and written in the internal variable table.

Third Embodiment

In the third embodiment of the present invention to be described below, a compensation value of the rotational speed of the disk is calculated according to the displacement Δr in the radial direction of the disk so that the time interval between servo sectors takes the initial value $TS_0$ even when disk shifting occurs and according to this compensation value, the rotational speed f of the spindle motor is adjusted.

Figure 12A:
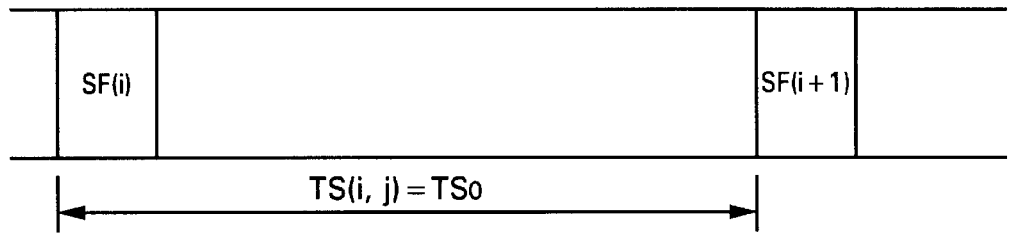
FIG. 12 shows a disk rotational speed controlling procedure in a third embodiment of the present invention.

FIG. 12 shows a controlling procedure for the rotational speed of the disk in the third embodiment of the present invention. As shown in FIG. 12(a), in case the initial value $f_0$ is assumed for the rotational speed (rpm) $f[s^{-1}]$ of the spindle motor between the servo areas SF(i) and SF(i+1) while the displacement Δr(i) of the servo sector SF(i) in the radial direction of the disk is 0, the time interval TS(i)[s] between servo sectors SS(i,j) and SS(i+1,j) takes the initial value $TS_0$. Consequently, in case a search window SW is set at a time interval $TS_0$, the SAM of the servo area SF(i+1) can be detected.

Figure 12B:
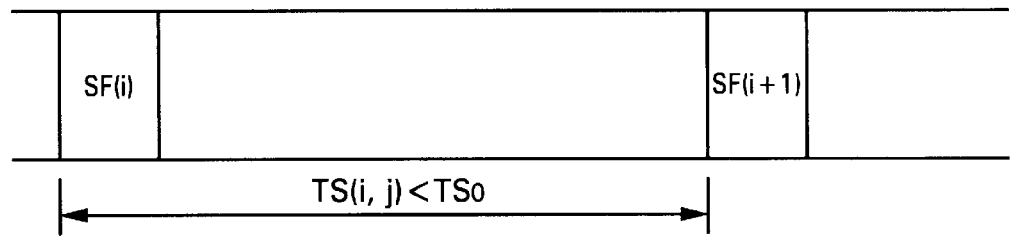

If $f=f_0$ is kept as is while Δr(i)>0 is satisfied, TS(i,j)<$t_0$ is assumed as shown in FIG. 12(b). Thus, in case of f<$f_0$, TS(i,j) becomes $TS_0$ as shown in FIG. 12(a).

Figure 12C:
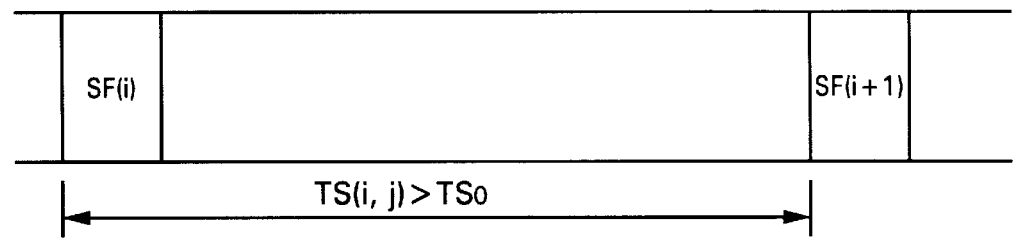

On the contrary, in case $f=f_0$ is kept as is while Δr(i,j)<0 is satisfied, TS(i,j)>$TS_0$ is satisfied as shown in FIG. 12(c). Thus, f>$f_0$ is satisfied so as to satisfy TS(i,j)=$TS_0$ as shown in FIG. 12(a).

The disk drive in this third embodiment calculates the compensation value f(i,j) of the rotational speed of the spindle motor 1 between servo sectors SS(i,j) and SS(i+1,j) (that is, the rotational speed of the disk D) as follows:

$$f(i,j)=1/\{TS(i,j)'N\}=f_0'r(i)/R(j)=f_0'\{R(j)+\Delta r(i)\}/R(j)=f_0'\{R(j)+k'DPF(i)\}/R(j) \quad (5)$$

$$=f_0'Df(i,j)=\{1/(t_0'N)\}+Df(i,j)$$

The disk drive controls the spindle motor 1 so as to rotate the spindle motor at this rotational speed compensation value f(i,j), thereby holding the time interval between servo sectors at the initial value $TS_0$.

Figure 13:
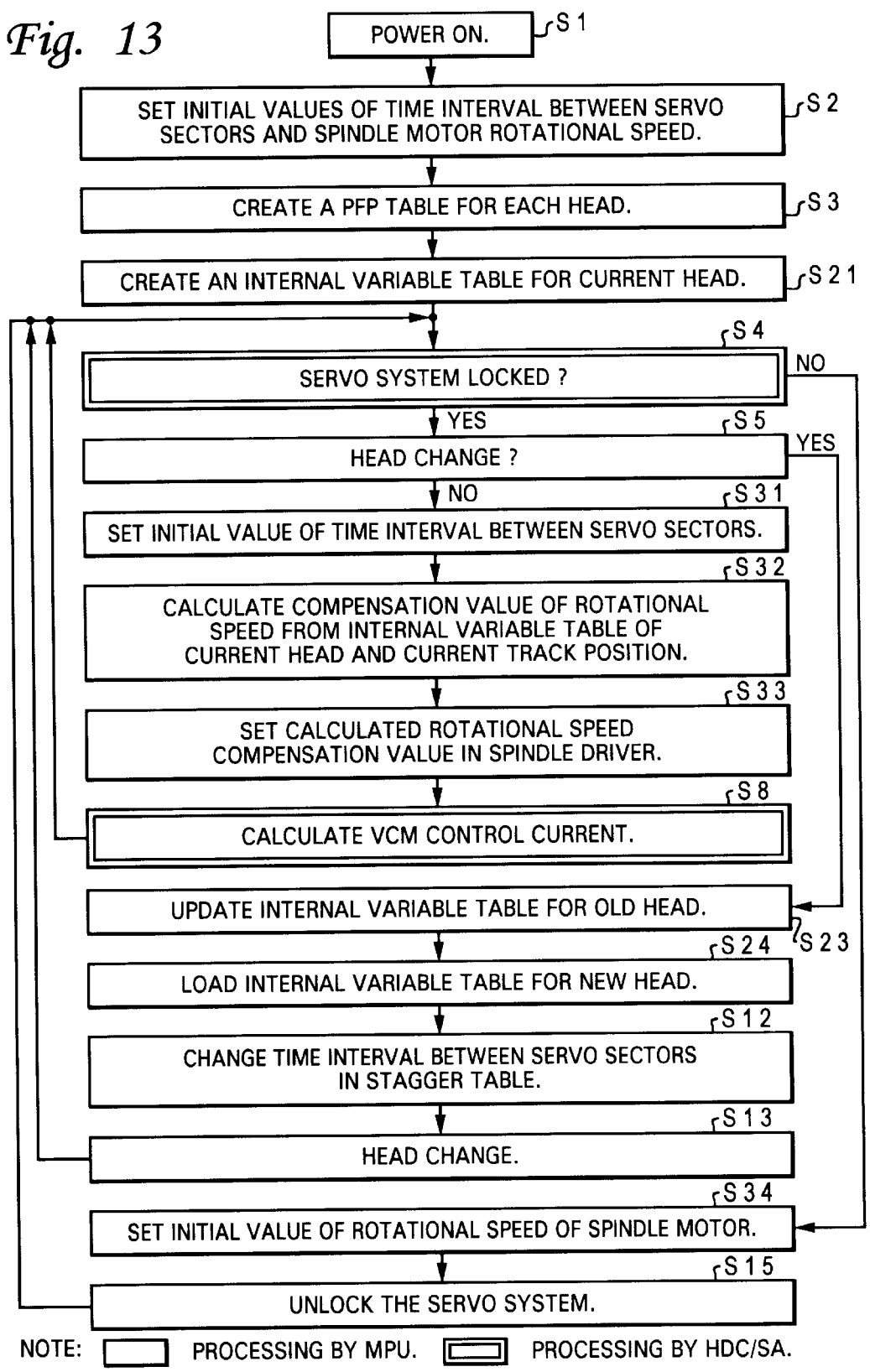
FIG. 13 is a flowchart of a process for controlling a servo system in the disk rotational speed controlling procedure in the third embodiment of the present invention.
Figure 14:
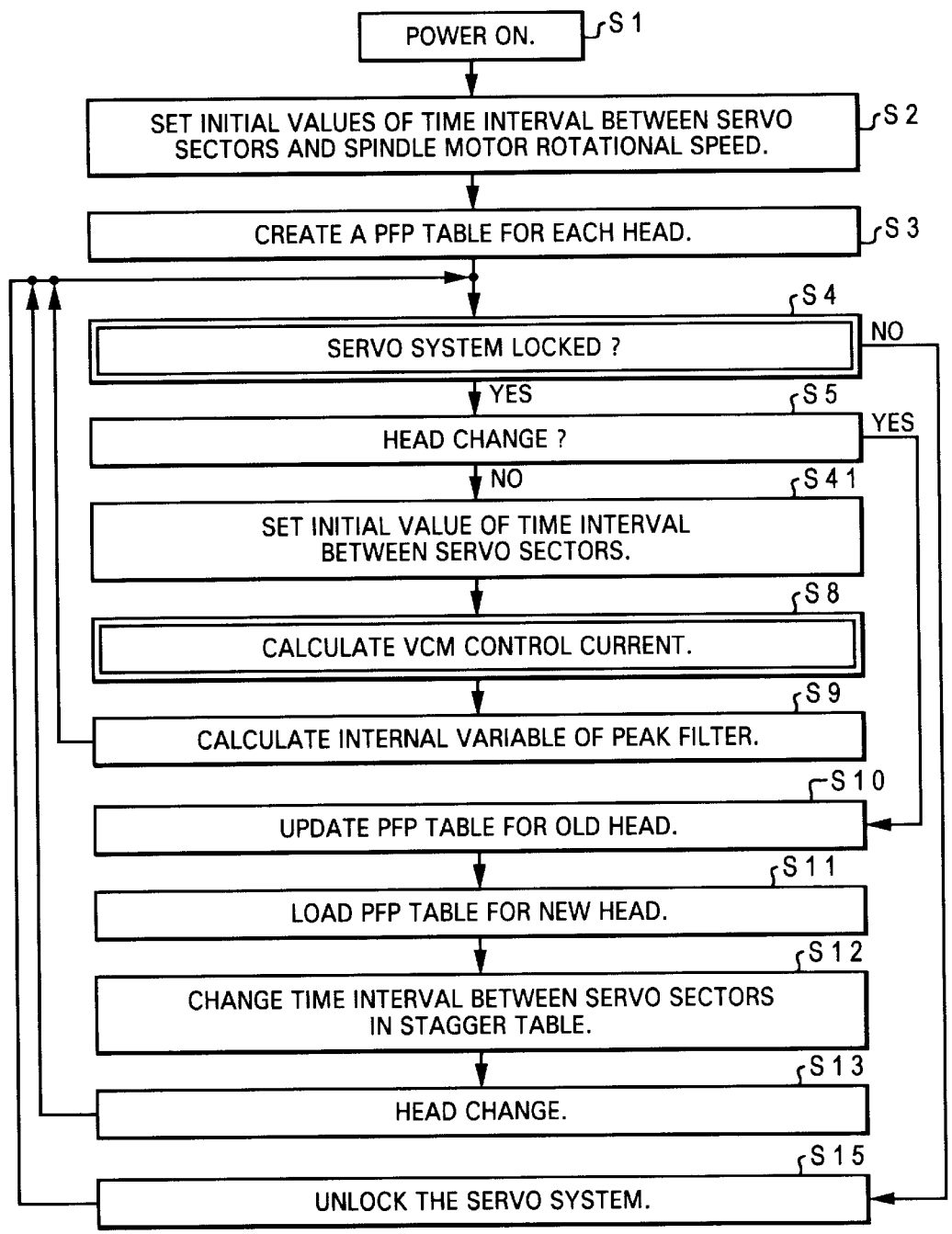
FIG. 14 is a flowchart of a process by which a conventional servo system controlling procedure is implemented according to the present invention.

FIG. 13 is a flowchart for controlling the servo system in the controlling procedure for the rotational speed of the disk in the third embodiment of the present invention. In FIG. 13, the same numbers are given to the same steps as those shown in FIG. 11, avoiding redundant description. The configuration of the disk drive in this third embodiment is the same as that of the disk drive 100 (see FIG. 1) in the above first embodiment.

Servo Controlling Procedure

In case the servo system is locked in step S4 and no head change is done in step S5, the MPU 11 sets the initial value $TS_0$ of the time interval between servo sectors in the HDC 12 in step S31. The processing in this step S31 is required to restore the initial value $TS_0$ for the time interval between servo sectors, which is changed according to the set value in the stagger table in step S12 in which a head change is done.

Then, in step S32, the MPU 11 reads the internal variable value PF(i) from the internal variable table and calculates the rotational speed compensation value $f(i,j)=f_0+Df(i,j)$ between servo areas SS(i) and SF(i+1) from this internal variable value PF(i) and the radius R(j) of the track T(j) in which the head is currently positioned with use of the above expression (5).

And, in step S33, the MPU 11 sets the calculated rotational speed compensation value f(i,j) in the spindle driver 3. After that, the MPU 11 calculates the PES value P(i), the VCM control current value CNT(i), and the filtered VCM control current value CNTF(i) sequentially in step S8 and sets the filtered VCM control current value CNTF(i) in the VCM driver 4. The MPU 11 then goes back to step S4.

The spindle driver 3 rotates the spindle motor 1 (that is, the disk D) at the above rotational speed compensation value f(i,j) after passing the servo sector SS(i,j) until the head H($k_T$) passes the servo sector SF(i+1,j). Consequently, the time interval TS(i,j) between servo sectors SS(i,j) and SS(i+1,j) is held at the initial value $TS_0$. And, in case a search window SW is set at the time interval $TS_0$, the servo address mark SAM of the servo area SF(i+1) can be detected surely and stably. Consequently, the servo information of the servo area SF(i+1) can be detected surely and stably.

Unlocking Processing

In case the servo system is unlocked in step S4, the MPU 11 sets the initial value $f_0$ of the rotational speed in the spindle driver 3 in step S34. Consequently, the disk D rotates at a rotational speed $f_0$.

After that, the MPU 11 makes the HDC 12 detect the servo address mark SAM from every area of a signal read by the head so as to unlock the servo system without setting a search window SW in step S15. In case each SAM is detected, the MPU 11 goes back to step S4.

Consequently, in step S4, the HDC 12 sets a search window SW at a time interval $TS_0$ in a signal read by the head H from the disk D rotating at a speed $f_0$ and searches the SAM in this search window SW.

According to the third embodiment of the present invention as described above, therefore, because a compensation value of the rotational speed of the disk is calculated according to the displacement Δr in the radial direction of the disk so that the initial value $TS_0$ is assumed for the time interval between servo sectors and the rotational speed of the spindle motor is adjusted according to this compensation value, servo information can be detected surely and stably even when disk shifting occurs.

While the method for controlling the rotational speed of the disk in the above third embodiment of the present invention applies to a servo controlling procedure that employs an internal variable table as described in the above second embodiment, the method can also apply to a servo controlling procedure that calculates the peak filter's internal variable values as needed as described in the first embodiment.

Advantages of the Invention

As described above, according to the servo information detection timing controlling method of the present invention, because the time interval TS(i,j) between the servo sectors in the servo area SF(i) and in the servo area SF(i+1) according to the displacement Δr(i) in the radial direction of the subject disk and the time interval for detecting servo information is adjusted according to this time interval TS(i,j), servo information can be detected surely and stably even when disk shifting occurs. This is an effect of the method.

Furthermore, according to the disk rotational speed controlling method of the present invention, because a compensation value of the disk rotational speed is calculated according to the displacement Δr in the radial direction of the subject disk so that the time interval between servo sectors takes a predetermined value and the disk recording medium rotational speed is adjusted according to this compensation value, servo information can be detected surely and stably even when disk shifting occurs. This is an effect of the method.

What is claimed is:

1. A method for controlling a timing for detecting servo information in a signal read by a read/write head from a disk recording medium in a disk drive, said method comprising the steps of:

calculating a time interval TS(i) between a time at which a servo sector in a servo area SF(i) passes under said read/write head and a time at which a servo sector in the next servo area SF(i+1) passes under said read/write head according to a displacement Δr(i) of said servo area SF(i) calculated with already detected servo information in a radial direction of said disk; and adjusting a time for detecting servo information according to said time interval TS(i).

2. The method according to claim 1, wherein said calculating step calculates said time interval TS(i) according to said displacement Δr(i) and a radius R from a center of servo information writing of said servo sector in said servo area SF(i).

3. The method according to claim 1, wherein said servo information includes a servo address mark for recognizing a position of a servo area, and said adjusting step adjusts a time interval for setting a search window used to detect said servo address mark in said read signal.

4. The method according to claim 1, wherein, when said servo area SF(i) passes under said read/write head after a servo area SF(i−1) passes under said read/write head, and following, a servo area SF(i+1) passes under said read/write head;

said calculating step calculates said time interval TS(i) in a disk rotation according to said displacement Δr(i) calculated utilizing the servo information in a servo sector in said detected SF(i−1); and said adjusting step adjusts the time interval in said disk rotation between a detection of servo information in said SF(i) and a detection of servo information in said SF(i+1) according to said TS(i).

5. The method according to claim 1, wherein, when a servo area SF(i+1) passes under said read/write head after a servo area SF(i) passes under said read/write head, said calculating step stores said displacement Δr(i) calculated in at least one rotation before a disk rotation in a storage means of said disk drive and calculates a time interval TS(i) between servo sectors in said SF(i) and in said SF(i+1) according to said stored displacement Δr(i) in said disk rotation; and said adjusting step adjusts the time interval in said disk rotation between the detection of the servo information in said SF(i) and the detection of the servo information in said SF(i+1) according to said TS(i).

6. The method according to claim 5, wherein said method further comprises updating said displacement Δr(i) stored in said storage means in response to powering of said disk drive and/or changing of said read/write head.

7. The method of claim 1, wherein said disk drive is provided with said disk recording medium with a servo sector format and is enabled to rotate said disk recording medium at a predetermined rotational speed, and further wherein said disk recording medium is enabled to record servo information in each servo sector in a servo area thereon, wherein said calculating step calculates changes in said rotational speed and said time interval utilizing said servo information.

8. The method of claim 1, further comprising:

calculating a compensation value for a rotational speed of said disk recording medium for keeping at a predetermined value the time interval between a first passing of a servo sector in a servo area SF(i) under said read/write head and a second passing of a servo sector in the next servo area SF(i+1) under said read/write head according to a displacement Δr(i) of said servo area SF(i) calculated utilizing already detected servo information in a radial direction of said disk; and adjusting said rotational speed of said disk recording medium according to said compensation value.

9. A method for controlling a rotational speed of a disk recording medium in a disk drive provided with said disk recording medium with a servo sector format, said method comprising the steps of:

calculating a compensation value for said rotational speed of said disk recording medium for keeping at a predetermined value the time interval between a first passing of a servo sector in a servo area SF(i) under said read/write head and a second passing of a servo sector in the next servo area SF(i+1) under said read/write head according to a displacement Δr(i) of said servo area SF(i) calculated utilizing already detected servo information in a radial direction of said disk; and adjusting said rotational speed of said disk recording medium according to said compensation value.

10. The method of claim 9, wherein a servo information is recorded in each servo sector in a servo area on said disk recording medium, said method further comprising:

calculating a time interval TS(i) between a time at which a servo sector in a servo area SF(i) passes under said read/write head and a time at which a servo sector in the next servo area SF(i+1) passes under said read/write head according to a displacement Δr(i) of said servo area SF(i) calculated with already detected servo information in a radial direction of said disk; and adjusting a time interval for detecting servo information according to said time interval TS(i).

11. A disk drive, comprising:

a disk recording medium recorded with servo information in a plurality of servo areas thereon in a sector servo format;

a spindle motor for rotating said disk recording medium;

a disk rotation controller for controlling a rotational speed of said spindle motor;

an access mechanism for holding a read/write head and moving said read/write head in the radial direction of said disk recording medium; and head position controlling means for detecting servo information in a signal read by said read/write head from said disk recording medium and controlling said access mechanism according to the servo information;

wherein said head position controlling means detects the servo information in said read signal with use of a servo information detection timing controlling method comprising:

calculating a time interval TS(i) between a time at which a servo sector in a servo area SF(i) passes under said read/write head and a time at which a servo sector in the next servo area SF(i+1) passes under said read/write head according to a displacement Δr(i) of said servo area SF(i) calculated with already detected servo information in a radial direction of said disk; and adjusting a time interval for detecting servo information according to said time interval TS(i).

12. A disk drive, comprising:

a disk recording medium recorded with servo information in a plurality of servo areas thereon in a sector servo format;

a spindle motor for. rotating said disk recording medium;

a disk rotation controller for controlling a rotational speed of said spindle motor;

an access mechanism for holding a read/write head and moving said read/write head in the radial direction of said disk recording medium; and head position controlling means for detecting servo information in a signal read by said read/write head from said disk recording medium and controlling said access mechanism according to the servo information;

wherein said disk rotation controller controls said rotational speed of said disk with use of said disk rotational speed controlling method comprising:

calculating a compensation value for said rotational speed of said disk recording medium for keeping at a predetermined value the time interval between a first passing of a servo sector in a servo area SF(i) under said read/write head and a second passing of a servo sector in the next servo area SF(i+1) under said read/write head according to a displacement Δr(i) of said servo area SF(i) calculated utilizing already detected servo information in a radial direction of said disk; and adjusting said rotational speed of said disk recording medium according to said compensation value.

* * * * *

UNITED STATES PATENT AND TRADEMARK OFFICE
CERTIFICATE OF CORRECTION

PATENT NO. : 6,515,813 B2
DATED : February 4, 2003
INVENTOR(S) : Kitazaki et al.

It is certified that error appears in the above-identified patent and that said Letters Patent is hereby corrected as shown below:

Column 4,
Line 20, delete "the date is".

Column 5,
Line 21, delete "SF(i)" and insert -- SF(1) --.

Column 11,
Line 10, delete "14" and insert -- R=14 --.

Signed and Sealed this

Tenth Day of February, 2004

JON W. DUDAS
*Acting Director of the United States Patent and Trademark Office*